(12) United States Patent
Oguchi et al.

(10) Patent No.: US 10,445,026 B2
(45) Date of Patent: Oct. 15, 2019

(54) PRINTER

(71) Applicant: FUJITSU COMPONENT LIMITED, Tokyo (JP)

(72) Inventors: Tatsuya Oguchi, Tokyo (JP); Sumio Watanabe, Tokyo (JP); Yukihiro Mori, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/120,621

(22) Filed: Sep. 4, 2018

(65) Prior Publication Data

US 2019/0087134 A1   Mar. 21, 2019

(30) Foreign Application Priority Data

Sep. 15, 2017 (JP) ................... 2017-177306

(51) Int. Cl.
*G06F 3/12* (2006.01)
*B41J 3/36* (2006.01)
*B41J 3/44* (2006.01)

(52) U.S. Cl.
CPC .............. *G06F 3/1204* (2013.01); *B41J 3/36* (2013.01); *B41J 3/44* (2013.01); *G06F 3/1254* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 4,656,524 | A | * | 4/1987 | Norris ................. H04N 1/0402 358/401 |
| 2001/0020576 | A1 | * | 9/2001 | Campana .............. H01H 19/03 200/336 |
| 2008/0238971 | A1 | | 10/2008 | Cook et al. |
| 2013/0088097 | A1 | * | 4/2013 | Kim ....................... H02J 9/005 307/140 |
| 2013/0235000 | A1 | * | 9/2013 | Lee ....................... G06F 3/0227 345/184 |
| 2014/0368868 | A1 | | 12/2014 | Park et al. |
| 2016/0082719 | A1 | | 3/2016 | Harada et al. |
| 2018/0010930 | A1 | * | 1/2018 | Isikman .................. G01D 5/30 |
| 2018/0234789 | A1 | * | 8/2018 | Ohgishi ................ H04W 88/12 |

FOREIGN PATENT DOCUMENTS

| | | |
|---|---|---|
| EP | 3381703 | 10/2018 |
| JP | H07-222223 | 8/1995 |
| JP | 2003-500245 | 1/2003 |
| WO | 00-71358 | 11/2000 |

* cited by examiner

*Primary Examiner* — Frantz Bataille
(74) *Attorney, Agent, or Firm* — IPUSA, PLLC

(57) ABSTRACT

A printer includes a print module that prints data on a recording medium, a communication module that wirelessly communicates with an information apparatus, a pressable switch, a rotatable dial knob, and a controller that sends, via the communication module to the information apparatus, information for operating the information apparatus according to operations of the switch and the dial knob.

5 Claims, 29 Drawing Sheets

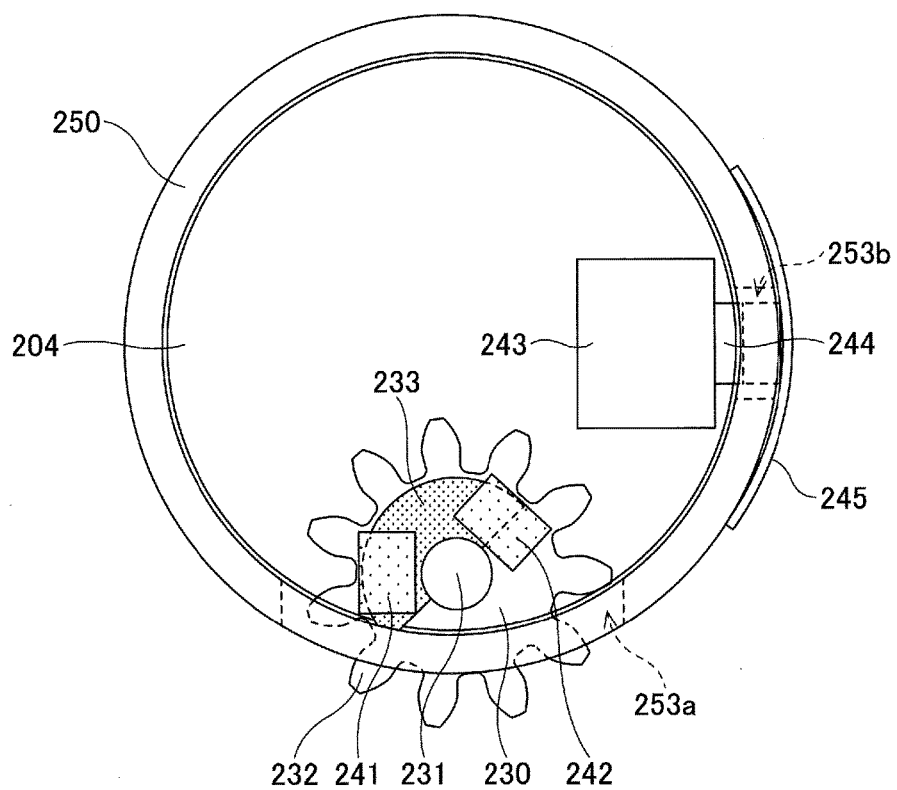
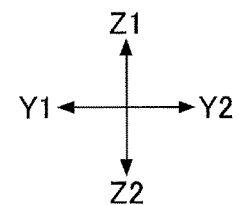
FIG.6

PRINTER

CROSS-REFERENCE TO RELATED APPLICATION

The present application is based upon and claims priority to Japanese Patent Application No. 2017-177306, filed on Sep. 15, 2017, the entire contents of which are incorporated herein by reference.

BACKGROUND OF THE INVENTION

1. Field of the Invention

An aspect of this disclosure relates to a printer.

2. Description of the Related Art

Portable printers having a box shape are carried in, for example, a bag. Accordingly, there is a demand for smaller printers with improved portability, and printers with various configurations are proposed (see, for example, Japanese Laid-Open Patent Publication No. 2003-500245 and Japanese Laid-Open Patent Publication No. H07-222223).

Such a printer is used to print information stored in an information communication apparatus. If a printer has a function to input information to an information communication apparatus, a user does not have to carry an input device such as a mouse and the convenience of the user may improve.

Accordingly, there is a demand for a portable printer with an information input function.

SUMMARY OF THE INVENTION

In an aspect of this disclosure, there is provided a printer including a print module that prints data on a recording medium, a communication module that wirelessly communicates with an information apparatus, a pressable switch, a rotatable dial knob; and a controller that sends, via the communication module to the information apparatus, information for operating the information apparatus according to operations of the switch and the dial knob.

BRIEF DESCRIPTION OF THE DRAWINGS

FIG. 6 is a drawing illustrating a configuration of the knock part;

DESCRIPTION OF EMBODIMENTS

Embodiments of the present invention are described below with reference to the accompanying drawings. Throughout the drawings, the same reference number is assigned to the same component, and repeated descriptions of the same component are omitted. In the present application, an X1-X2 direction, a Y1-Y2 direction, and a Z1-Z2 direction indicate directions that are orthogonal to each other.

<Printer>

A printer 200 according to an embodiment is described below. The printer 200 prints information received from various information communication apparatuses on recording media.

Figure 1:
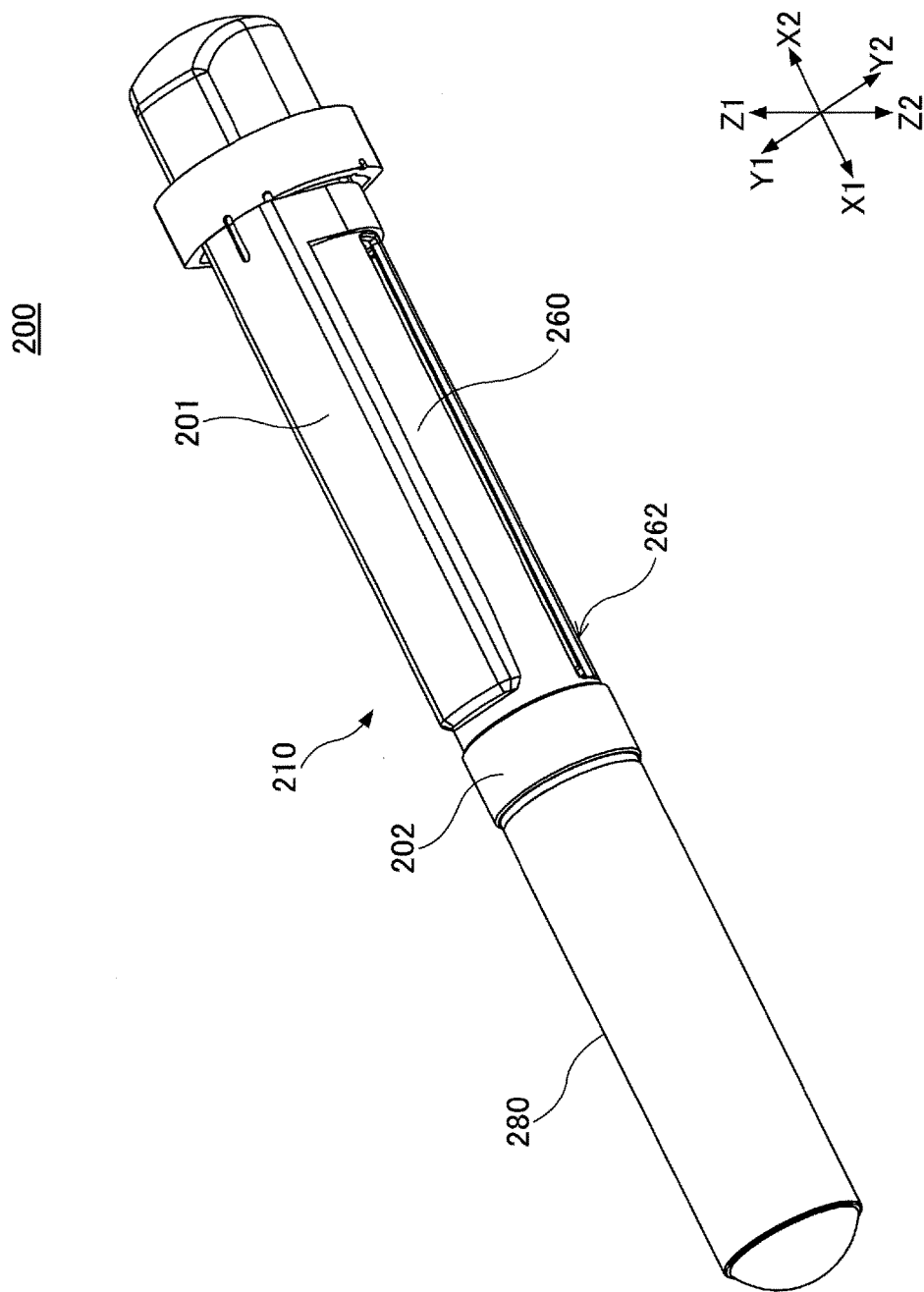
FIG. 1 is a perspective view of a printer according to an embodiment.
Figure 2:
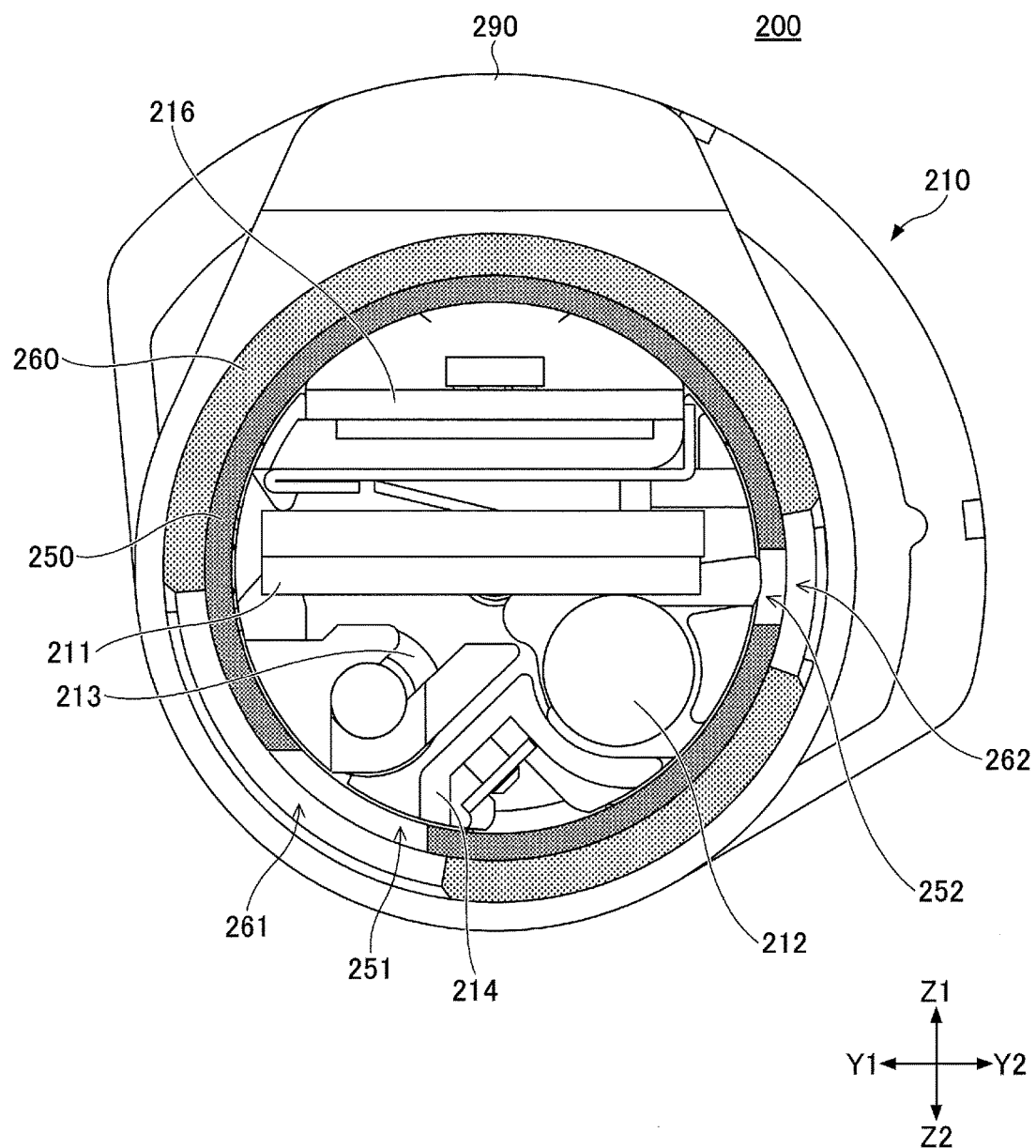
FIG. 2 is a cross-sectional view of the printer.

The printer 200 is described below with reference to FIGS. 1 and 2. FIG. 1 is a perspective view and FIG. 2 is a cross-sectional view of the printer 200. The printer 200 has a cylindrical outer shape, and is an Internet of Things (IoT) device including a printing function and a radio communication function.

The printer 200 includes a print module 210. The print module 210 includes a print head 211 such as a thermal head, a platen roller 212, a feed roller 213, a medium guide 214, a pressure spring, a control board 216, an inner cover 250, and an outer cover 260. The print head 211 is pressed against the platen roller 212 by the pressure spring. A recording medium is inserted into the printer 200 along the medium guide 214 from a side of the printer 200 where the low-adhesive feed roller 213 is provided. While the recording medium is fed between the print head 211 and the platen roller 212 by the platen roller 212, information is printed on the recording medium and the recording medium is ejected. Electronic circuits and electronic components for controlling the printer 200 are mounted on the control board 216.

The inner cover 250 and the outer cover 260 have a cylindrical shape and are configured such that the inner cover 250 is placed in the outer cover 260. The inner cover 250 includes a feed port 251 and an ejection port 252 that extend along its generating line, and the outer cover 260 includes a feed port 261 and an ejection port 262 along its generating line. The outer cover 260 is rotatable relative to the inner cover 250 placed inside of the outer cover 260. When printing is performed by the printer 200, the feed port 251 and the feed port 261 are aligned with each other and opened, and the ejection port 252 and the ejection port 262 are aligned with each other and opened. A recording medium is inserted into the printer 200 through the feed ports 251 and 261, and is ejected through the ejection ports 252 and 262.

When the feed ports 251 and 261 are opened, a cassette 300 housing recording media can be connected to the feed port 261. When the printer 200 performs printing, print data is transmitted from an information apparatus to the printer 200 using a radio communication such as Bluetooth Low Energy (BLE). The printer 200 receives the print data and prints the print data.

The printer 200 includes a power source 280 containing a rechargeable battery such as a lithium ion battery, and is driven by power supplied from the rechargeable battery. The printer 200 includes a hook 201 on X2 side and a knock part 202 disposed between the printing module 210 and the power source 280 for inputting information.

For example, the printer 200 has a diameter of about 18 mm and a length of about 165 mm to about 170 mm. Thus, the printer 200 is small and can be carried without stress. With the hook 201, similarly to a pen, the printer 200 can be clipped to a chest pocket of clothing and carried.

<Printing Process>

Figure 3:
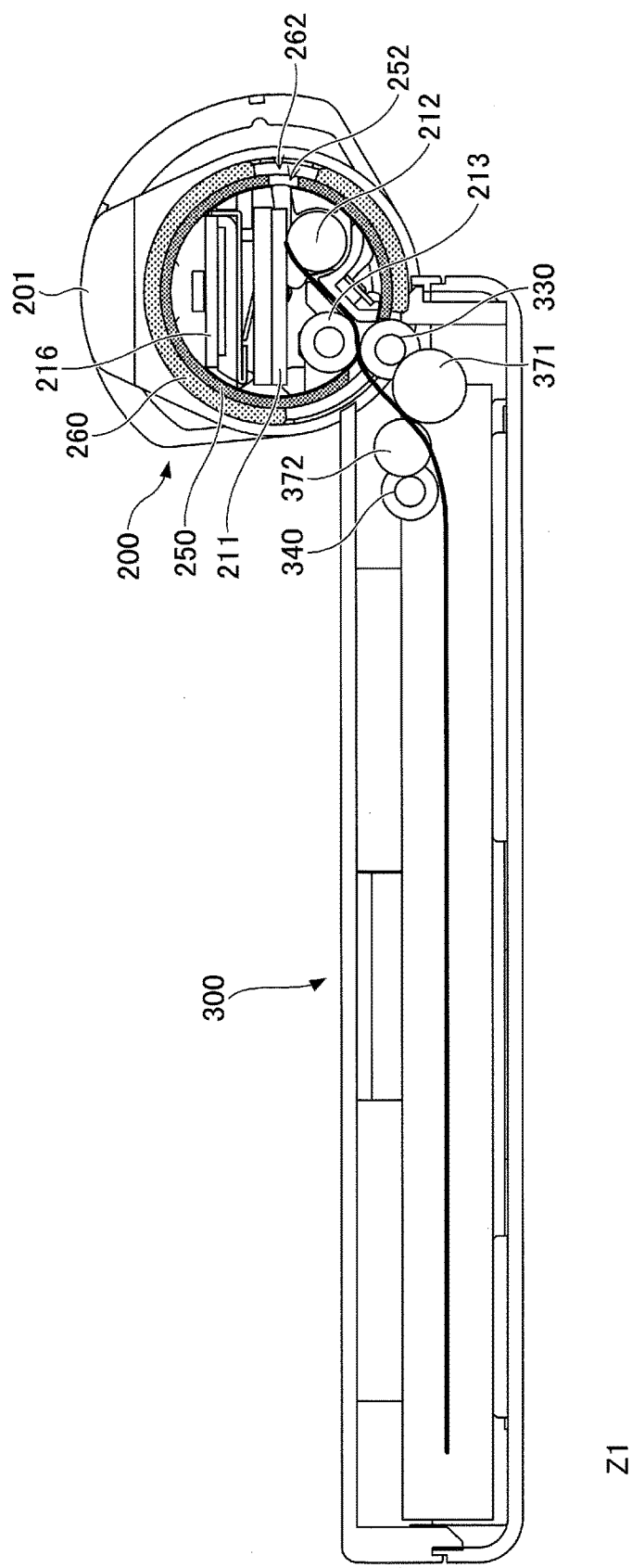
FIG. 3 is a drawing describing a printing process of the printer.

Next, a printing process of the printer 200 is described with reference to FIG. 3. In FIG. 3, the printer 200 is connected to the cassette 300.

When an opening of the cassette 300 is connected to the feed port 251 and the feed port 261, the feed roller 213 of the printer 200 is in contact with a first roller 330 of the cassette 300. The first roller 330 is rotated by the rotation of the feed roller 213. The cassette 300 includes a gear 371 and a gear 372 that cause a second roller 340 to rotate along with the rotation of the first roller 330. A gear connected directly to the first roller 330 engages with the gear 371, the gear 371 engages with the gear 372, and the gear 372 engages with a gear connected directly to the second roller 340. In FIG. 3, the teeth of the gear 371 and the gear 372 are omitted for brevity.

When the printer 200 performs printing, the feed roller 213 is rotated counterclockwise in FIG. 3 to feed a recording medium toward the print head 211. When the feed roller 213 is rotated counterclockwise, the first roller 330 in contact with the feed roller 213 rotates clockwise, and the rotation is transmitted via the gear 371 and the gear 372 to the second roller 340. When the first roller 330 rotates clockwise, the second roller 340 is caused to rotate counterclockwise via the gear 371 and the gear 372.

The second roller 340 is in contact with the uppermost recording medium in the cassette 300. When the second roller 340 rotates counterclockwise, the recording medium moves in Y2 direction and is fed toward the printer 200. Then, the recording medium passes through the opening of the cassette 300 and the feed ports 251 and 261 into a gap between the feed roller 213 and the first roller 330, and is fed toward the print head 211. The first roller 330 and the second roller 340 have a one-way function and do not rotate when the feed roller 213 rotates clockwise. Accordingly, the recording medium is not fed toward the cassette 300.

Print information stored in the information apparatus and a print command are transmitted from the information apparatus to the printer 200 via, for example, BLE, and printing is performed on a recording medium based on the print information.

<Operation Mechanism>

Next, an operation of the printer 200 is described. As illustrated in FIG. 1, the printer 200 includes the hook 201 and the knock part 202. The hook 201 includes a hook switch that is operated by moving the hook 201, and information can be input by operating the hook 201.

Figure 4:
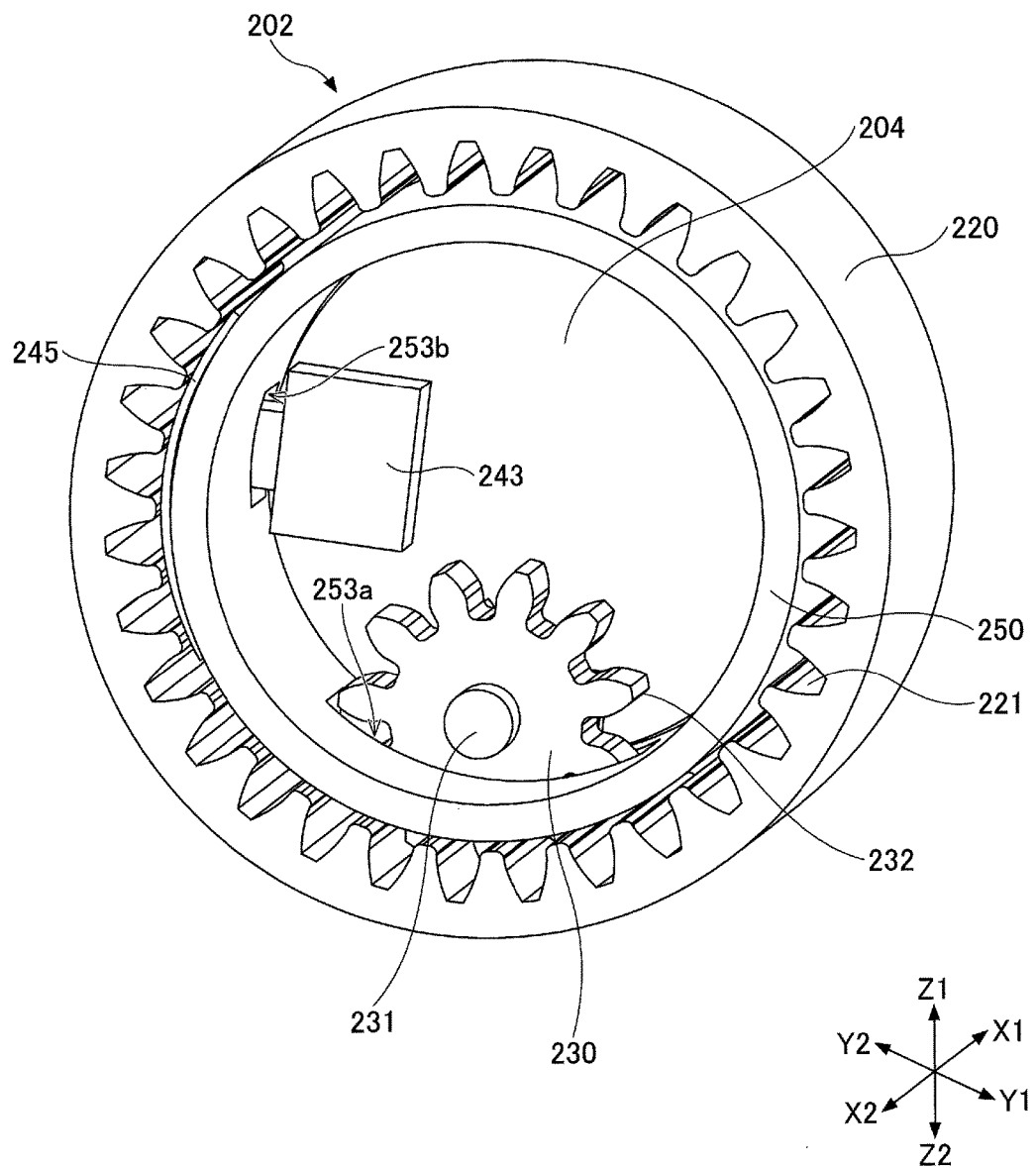
FIG. 4 is a perspective view of a knock part of the printer.
Figure 5:
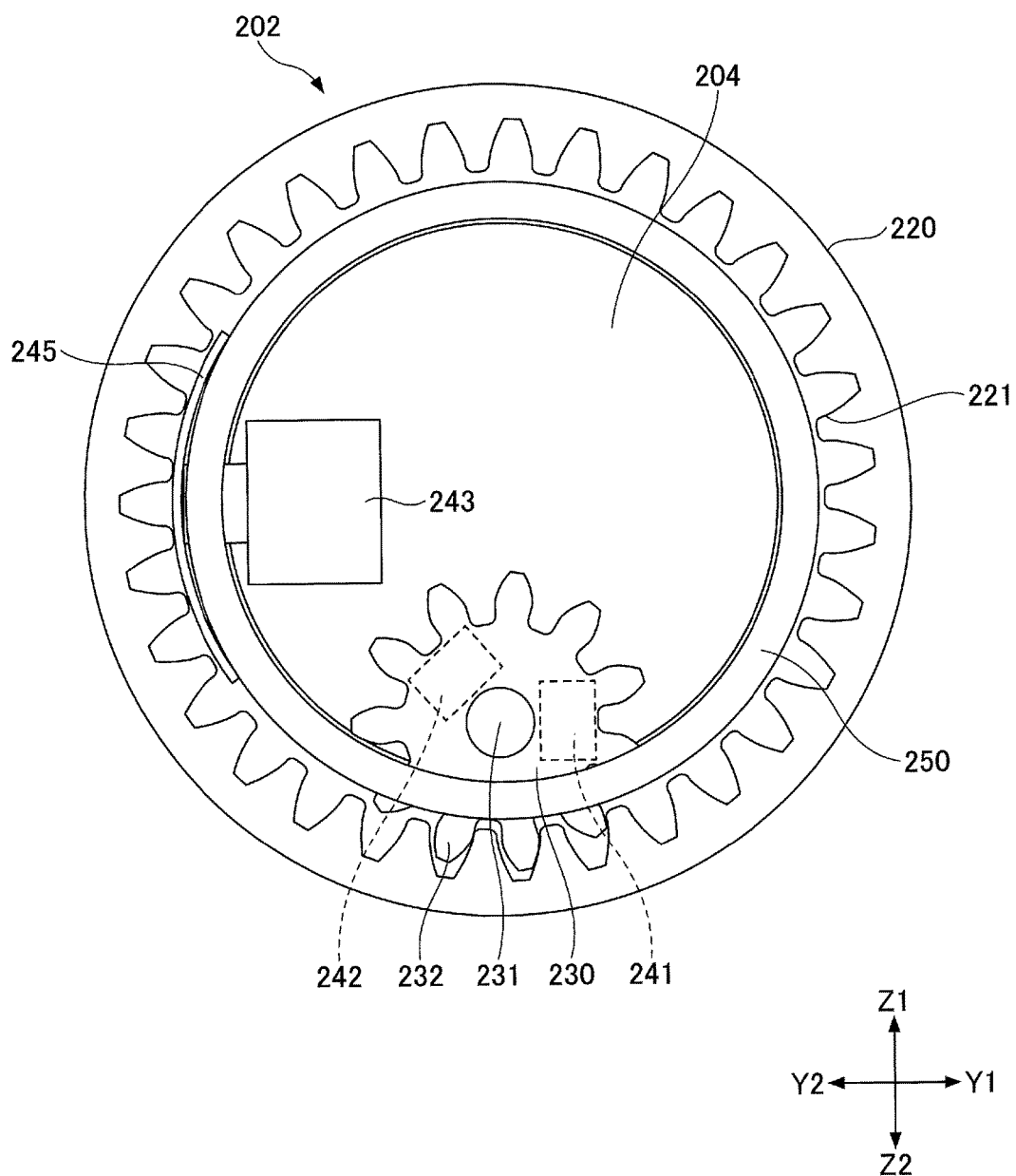
FIG. 5 is a drawing illustrating a configuration of the knock part.
Figure 7:
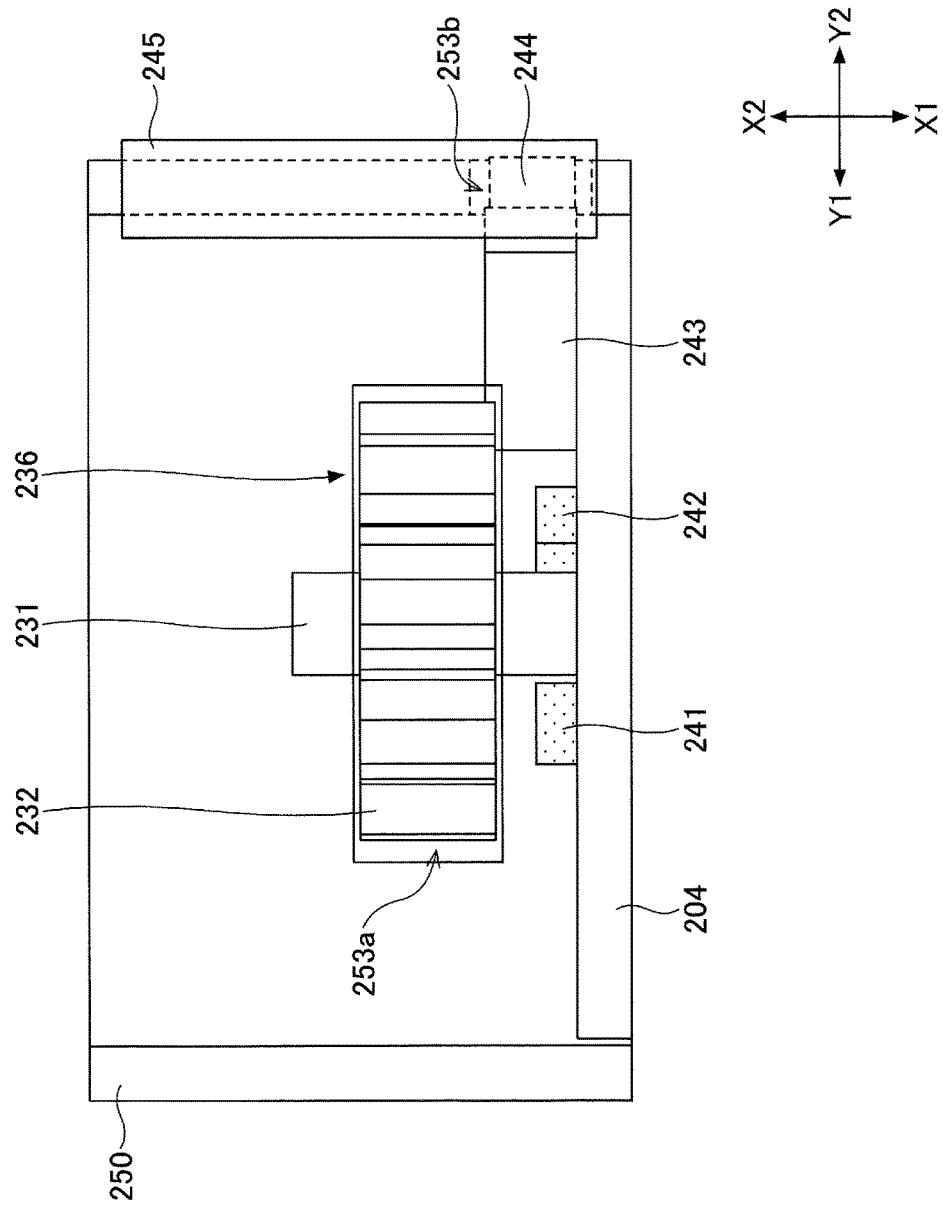
FIG. 7 is a drawing illustrating a configuration of the knock part.

FIG. 4 is a perspective view of the inside of the knock part 202, FIG. 5 is a drawing illustrating the knock part 202 seen from X2 side, FIG. 6 is a drawing illustrating the knock part 202 seen from X1 side, and FIG. 7 is a drawing illustrating the knock part 202 seen from Z1 side, where some components are made transparent.

As illustrated in FIGS. 4 through 7, the knock part 202 includes a dial knob 220, an encoder wheel 230, a first photo sensor 241, a second photo sensor 242, and a knock switch 243.

<Knock Part>

The cylindrical dial knob 220 includes gear teeth 221 on the inner side, and is disposed around the outer side of the inner cover 250. The encoder wheel 230 is disposed inside of the dial knob 220, is attached to a board 204 so as to be rotatable around a rotational shaft 231, and includes gear teeth 232 arranged along the circumference of the encoder wheel 230. An opening 253a is formed in an area of the inner cover 250 where the encoder wheel 230 is disposed. The gear teeth 232 engage with the gear teeth 221 through the opening 253a.

In the present embodiment, when the dial knob 220 is rotated, the encoder wheel 230 which the gear teeth 232 engaging with the gear teeth 221 rotates around the rotational shaft 231.

Figure 8:
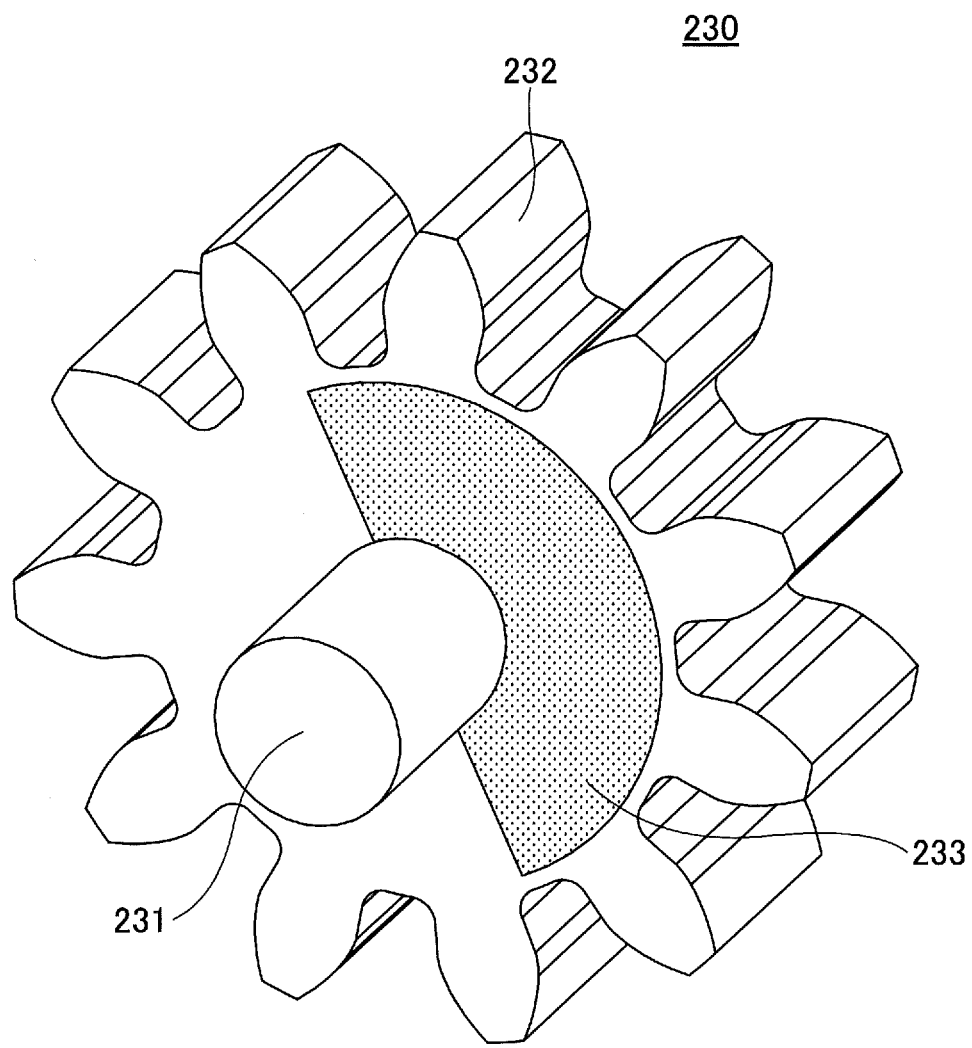
FIG. 8 is a drawing illustrating an encoder wheel of the printer.

The encoder wheel 230 is formed of a white material so as to reflect light. As illustrated in FIG. 8, a black non-reflecting part 233, which does not reflect light, is formed in a portion of a side surface of the encoder wheel 230 facing the first photo sensor 241 and the second photo sensor 242. The non-reflecting part 233 has a semicircular shape formed around the rotational shaft 231. Portions of the encoder wheel 230 other than the non-reflecting part 233 constitute a reflecting part that reflects light. The color of the non-reflecting part 233 is not necessarily black as long as the optical reflectance of the non-reflecting part 233 is lower than the optical reflectance of the reflecting part.

Each of the first photo sensor 241 and the second photo sensor 242 is a reflective optical sensor. The first photo sensor 241 and the second photo sensor 242 are disposed to be able to detect reflected light at different positions on the side surface of the encoder wheel 230. The first photo sensor 241 and the second photo sensor 242 are attached to the board 204.

<Rotational Direction Detection Method>

Next, a detection of the rotational direction of the knock part 202 is described. Information can be input to the printer 200 by rotating the dial knob 220 that is disposed around the outer side of the inner cover 250. When the dial knob 220 is rotated, the encoder wheel 230 rotates. The rotation of the encoder wheel 230 and the rotational direction of the dial knob 220 can be detected by using the first photo sensor 241 and the second photo sensor 242.

In the printer 200, when the dial knob 220 (not shown in FIG. 6) is rotated clockwise in a view from X1 side in FIG. 6, the encoder wheel 230 whose gear teeth 232 engaging with the gear teeth 221 also rotates clockwise. When the dial knob 220 is rotated counterclockwise in FIG. 6, the encoder wheel 230 also rotates counterclockwise. In the present embodiment, the rotation and the rotational direction of the dial knob 220 are detected by detecting the rotation and the rotational direction of the encoder wheel 230.

A detection of the rotational direction of the encoder wheel 230 is described with reference to FIGS. 9 through 18. The reflecting part of the encoder wheel 230 reflects light, but the non-reflecting part 233 absorbs light and does not reflect light. Each of the first photo sensor 241 and the second photo sensor 242 is a reflective optical sensor and includes a light emitter that emits light toward an object and a light receiver that detects the light reflected from the object. Accordingly, the light receiver does not detect light when the object does not exist or the object is formed of a material that does not reflect light.

When the non-reflecting part 233 is present in the detection position of each of the first photo sensor 241 and the second photo sensor 242, light emitted from the light emitter is not reflected by the non-reflecting part 233, and the light receiver does not detect light. On the other hand, when the non-reflecting part 233 is not present in the detection position and the reflecting part of the encoder wheel 230 is present in the detection position, light emitted from the light emitter is reflected by the reflecting part, and the light receiver detects the reflected light.

Accordingly, when the encoder wheel 230 is continuously rotated, the first photo sensor 241 and the second photo sensor 242 periodically detect light reflected by the reflecting part.

The first photo sensor 241 and the second photo sensor 242 are shifted from each other by about 135 degrees around the rotational shaft 231. Therefore, when the encoder wheel 230 is rotated around the rotational shaft 231, the phase of light detected by the first photo sensor 241 is shifted by about $3\pi/4$ from the phase of light detected by the second photo sensor 242.

A case where the encoder wheel 230 is rotated clockwise is described with reference to FIGS. 9 through 14.

Figure 9:
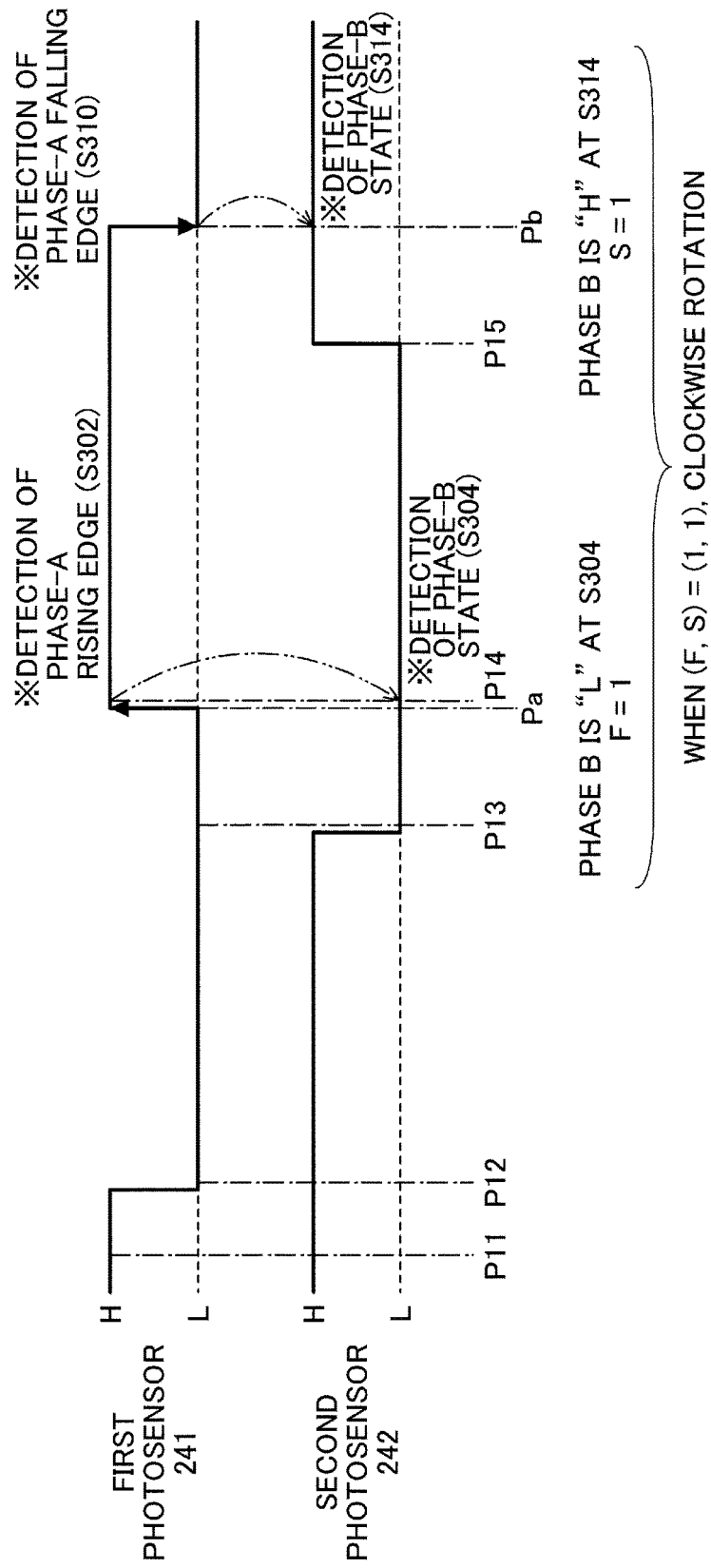
FIG. 9 is a timing chart illustrating a method of detecting a clockwise rotation of the encoder wheel according to an embodiment.
Figure 10:
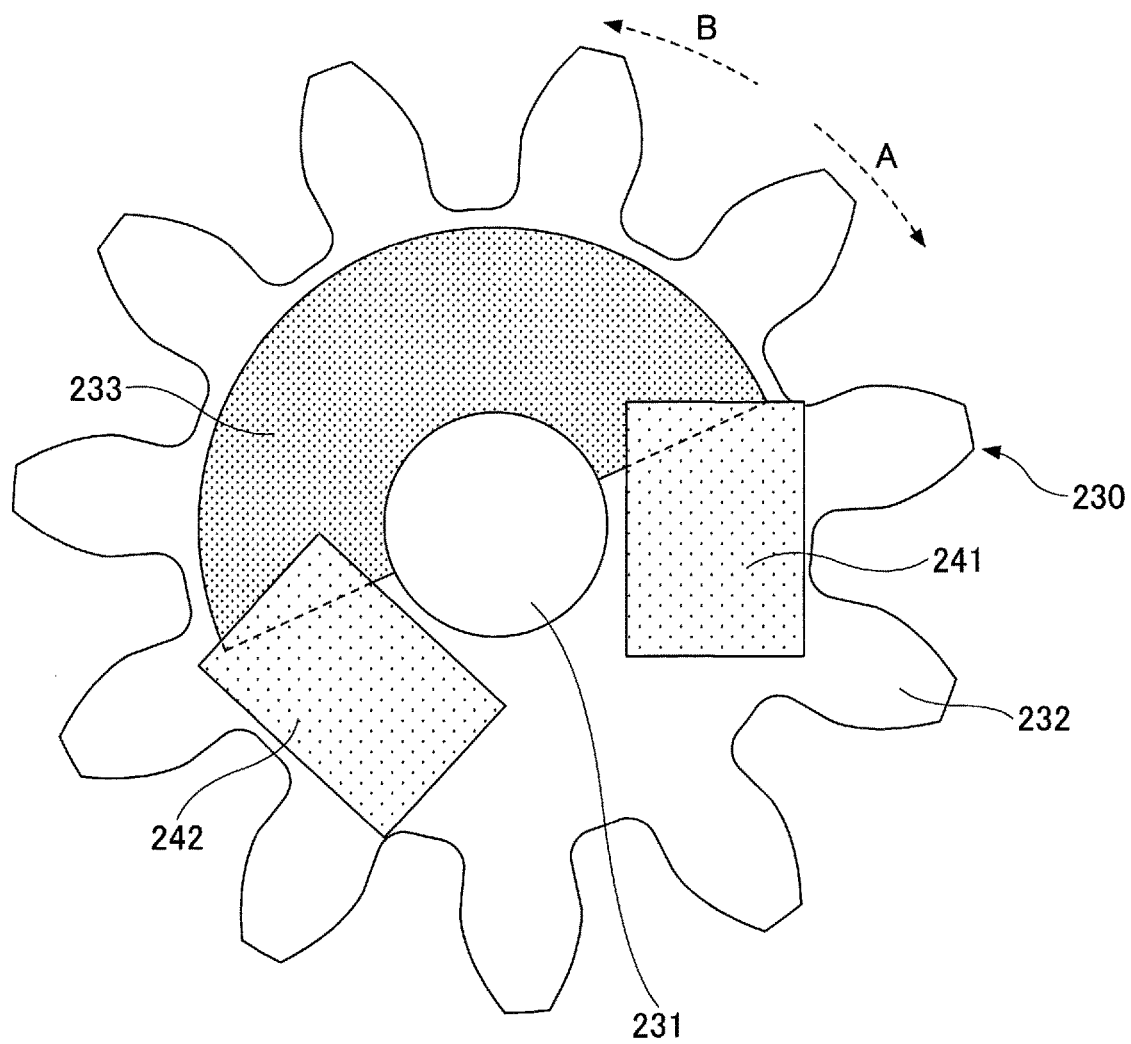
FIG. 10 is a drawing describing the method of detecting a clockwise rotation of the encoder wheel.

Initially, the encoder wheel 230 is in a state illustrated in FIG. 10 where the non-reflecting part 233 is not present in the detection positions of the first photo sensor 241 and the second photo sensor 242, and the first photo sensor 241 and the second photo sensor 242 detect light reflected from the encoder wheel 230. P11 in FIG. 9 indicates outputs of the first photo sensor 241 and the second photo sensor 242 in this state.

Figure 11:
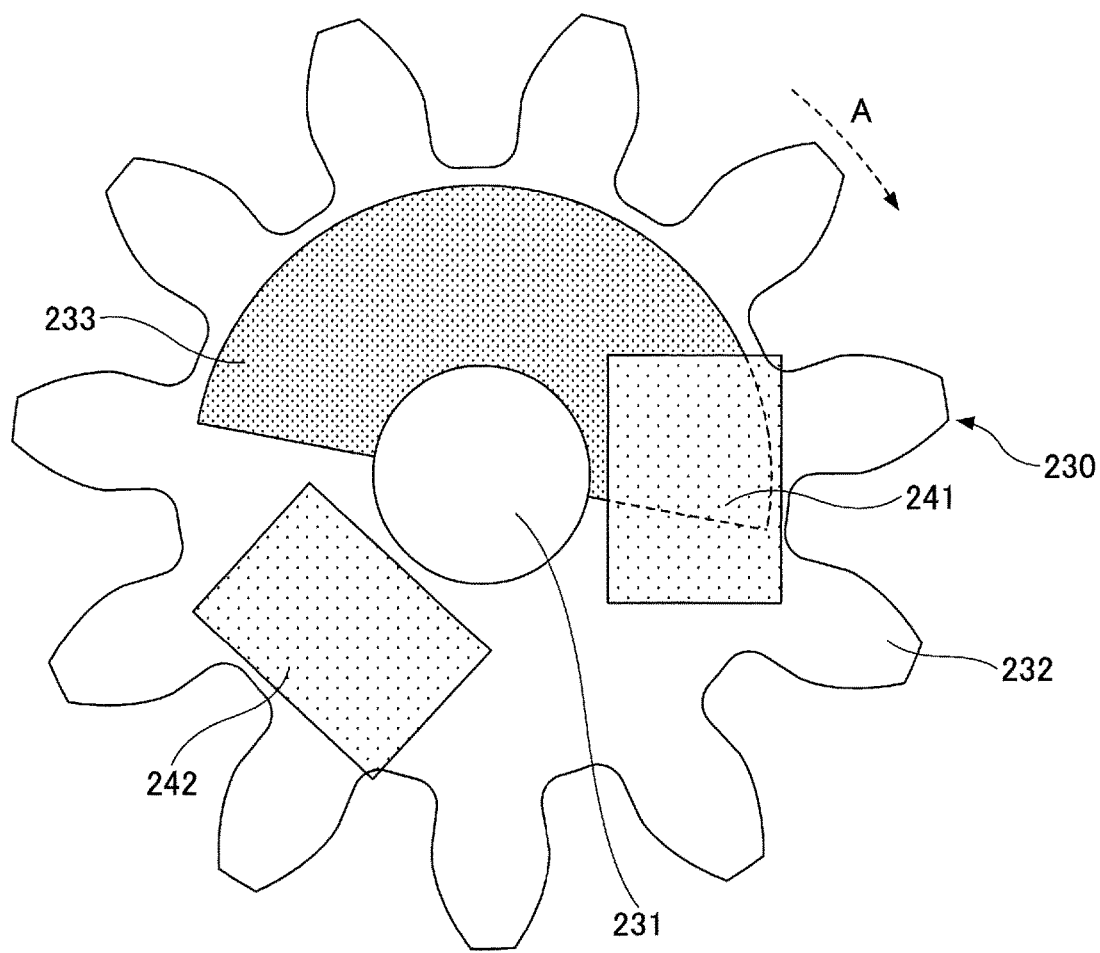
FIG. 11 is a drawing describing the method of detecting a clockwise rotation of the encoder wheel.

When the encoder wheel 230 is rotated clockwise in a direction indicated by an arrow A from the state in FIG. 10, the non-reflecting part 233 moves to the detection position of the first photo sensor 241 as illustrated in FIG. 11, and the first photo sensor 241 does not detect reflected light. On the other hand, the reflecting part is present in the detection position of the second photo sensor 242, and the second photo sensor 242 detects light reflected from the encoder wheel 230. P12 in FIG. 9 indicates outputs of the first photo sensor 241 and the second photo sensor 242 in this state. At P12, a falling edge of the output of the first photo sensor 241 is detected.

Figure 12:
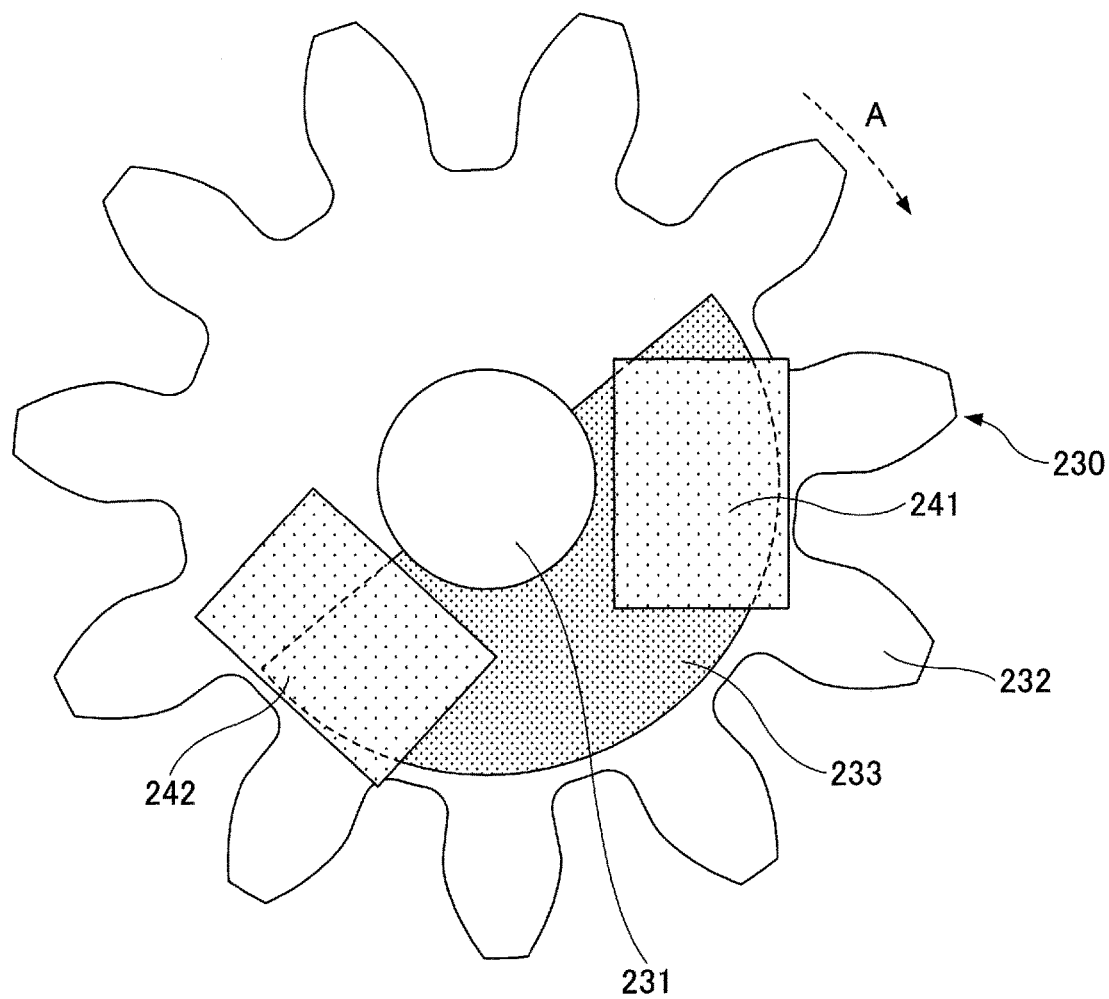
FIG. 12 is a drawing describing the method of detecting a clockwise rotation of the encoder wheel.

When the encoder wheel 230 is further rotated clockwise, the non-reflecting part 233 moves to the detection positions of both of the first photo sensor 241 and the second photo sensor 242 as illustrated in FIG. 12, and the first photo sensor 241 and the second photo sensor 242 do not detect reflected light. P13 in FIG. 9 indicates outputs of the first photo sensor 241 and the second photo sensor 242 in this state. At P13, a falling edge of the output of the second photo sensor 242 is detected.

Figure 13:
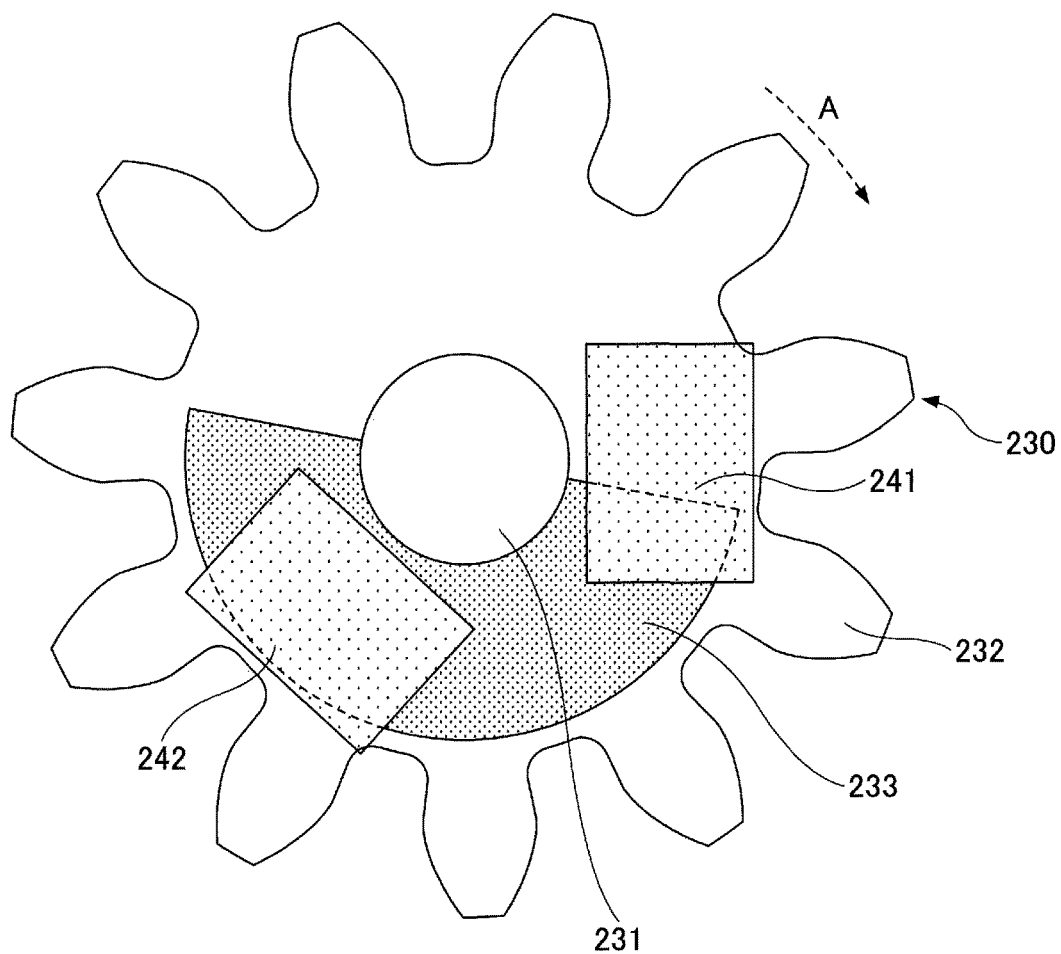
FIG. 13 is a drawing describing the method of detecting a clockwise rotation of the encoder wheel.

When the encoder wheel 230 is further rotated clockwise, the non-reflecting part 233 moves to a position illustrated in FIG. 13. In this state, the non-reflecting part 233 is not present in the detection position of the first photo sensor 241 and the first photo sensor 241 detects reflected light, and the non-reflecting part 233 is present in the detection position of the second photo sensor 242 and the second photo sensor 242 does not detect reflected light. P14 in FIG. 9 indicates outputs of the first photo sensor 241 and the second photo sensor 242 in this state. At P14, a rising edge Pa of the output of the first photo sensor 241 is detected.

Figure 14:
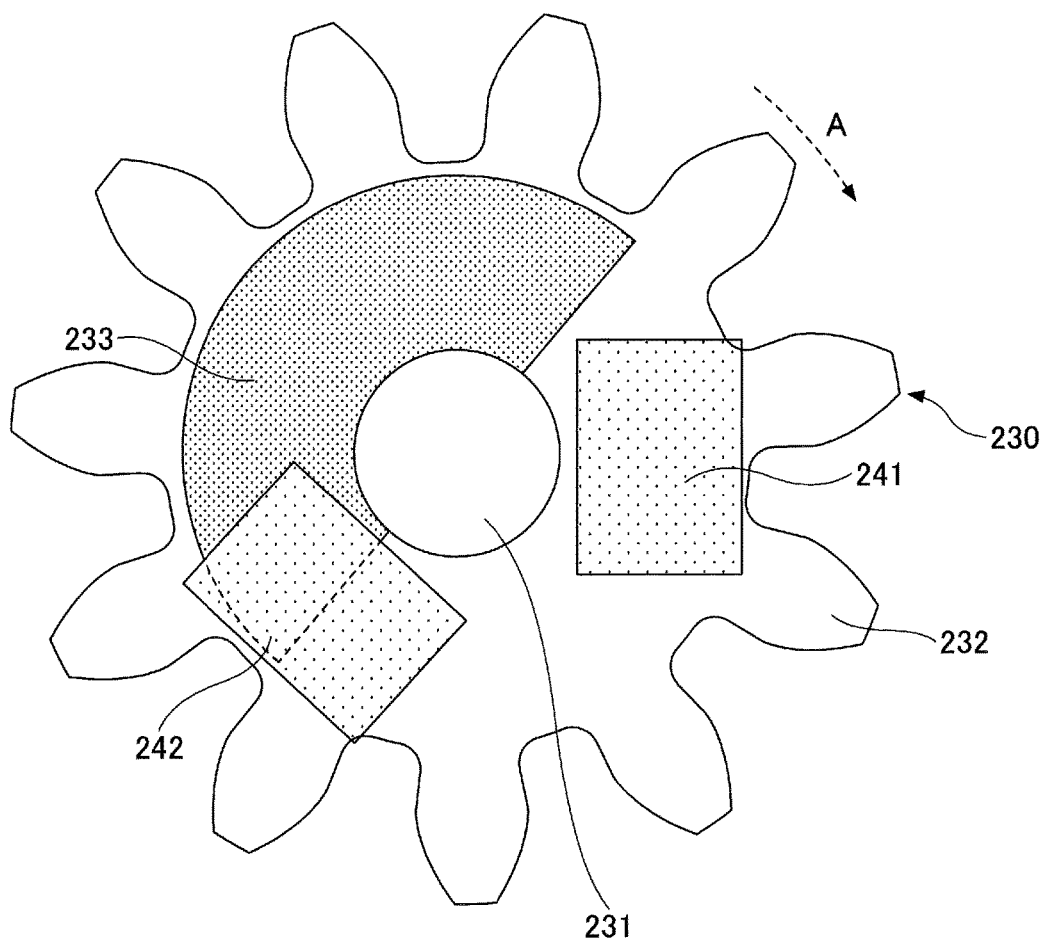
FIG. 14 is a drawing describing the method of detecting a clockwise rotation of the encoder wheel.

When the encoder wheel 230 is further rotated clockwise, the non-reflecting part 233 moves to a position illustrated in FIG. 14. In this state, the non-reflecting part 233 is not present in the detection position of the first photo sensor 241, and the first photo sensor 241 detects reflected light. On the other hand, the boundary between the non-reflecting part 233 and the reflecting part is present in the detection position of the second photo sensor 242. P15 in FIG. 9 indicates outputs of the first photo sensor 241 and the second photo sensor 242 in this state. At P15, a rising edge of the output of the second photo sensor 242 is detected. When the encoder wheel 230 is further rotated clockwise, the encoder wheel 230 returns to the state illustrated in FIG. 10.

In FIG. 9, a rising edge Pa indicates a point at which the output of the first photo sensor 241 changes from a state "L" where light is not detected to a state "H" where light is detected, and a falling edge Pb indicates a point at which the output of the first photo sensor 241 changes from the state "H" to the state "L".

Next, a case where the encoder wheel 230 is rotated counterclockwise is described with reference to FIGS. 15 through 19.

Initially, the encoder wheel 230 is in a state illustrated in FIG. 10 where the non-reflecting part 233 is not present in the detection positions of the first photo sensor 241 and the second photo sensor 242, and the first photo sensor 241 and the second photo sensor 242 detect light reflected from the encoder wheel 230. P11 in FIG. 15 indicates the outputs of the first photo sensor 241 and the second photo sensor 242 in this state.

Figure 15:
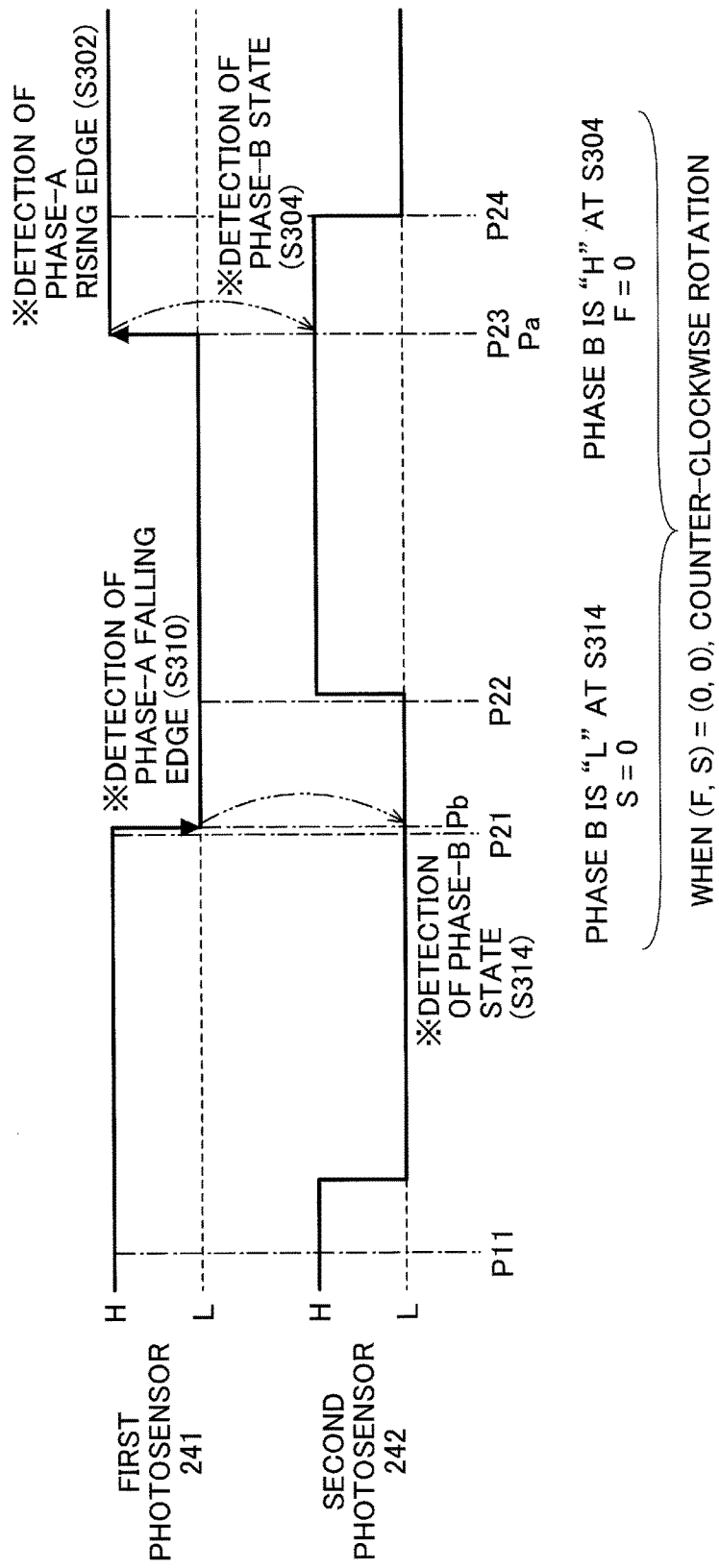
FIG. 15 is a timing chart illustrating a detection of a counterclockwise rotation of the encoder wheel according to an embodiment.
Figure 16:
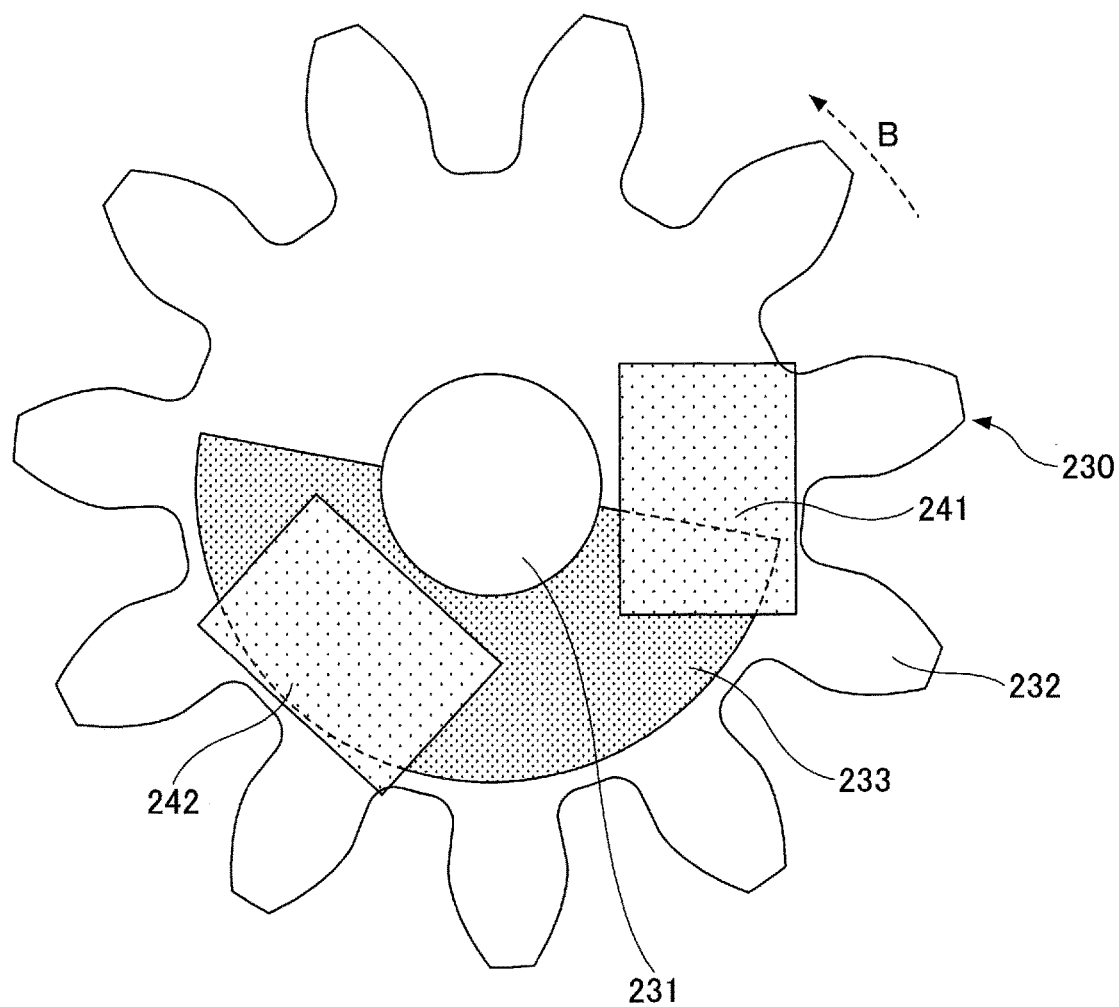
FIG. 16 is a drawing describing the method of detecting a counterclockwise rotation of the encoder wheel.

When the encoder wheel 230 is rotated counterclockwise in a direction indicated by an arrow B, the non-reflecting part 233 moves to a position illustrated in FIG. 16. In this state, the non-reflecting part 233 is not present in the detection position of the first photo sensor 241, and the first photo sensor 241 detects reflected light. On the other hand, the non-reflecting part 233 is present in the detection position of the second photo sensor 242, and the second photo sensor 242 does not detect reflected light. P21 in FIG. 15 indicates outputs of the first photo sensor 241 and the second photo sensor 242 in this state. At P21, a falling edge Pb of the output of the first photo sensor 241 is detected.

Figure 17:
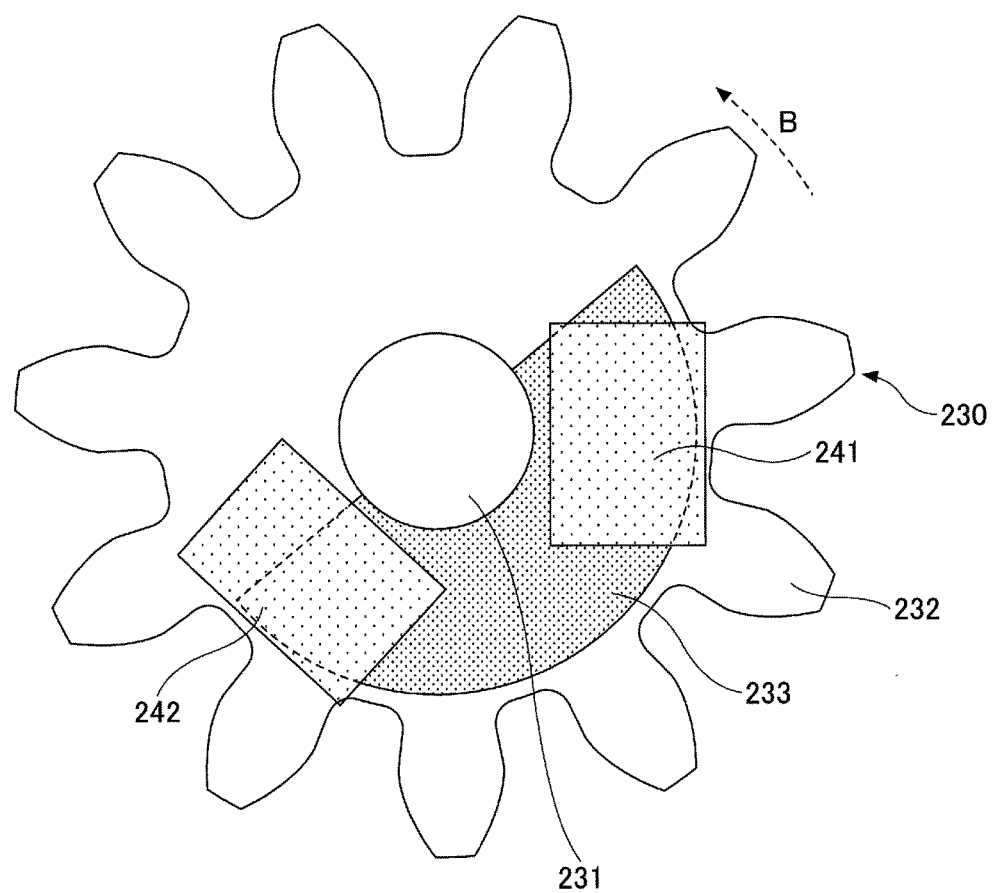
FIG. 17 is a drawing describing the method of detecting a counterclockwise rotation of the encoder wheel.

When the encoder wheel 230 is further rotated counterclockwise, the non-reflecting part 233 moves to a position illustrated in FIG. 17. In this state, the non-reflecting part 233 is present in the detection positions of both of the first photo sensor 241 and the second photo sensor 242, and the first photo sensor 241 and the second photo sensor 242 do not detect reflected light. P22 in FIG. 15 indicates the outputs of the first photo sensor 241 and the second photo sensor 242 in this state. When the encoder wheel 230 is further rotated counterclockwise, the reflecting part moves to the detection position of the second photo sensor 242, and a rising edge of the output of the second photo sensor 242 is detected.

Figure 18:
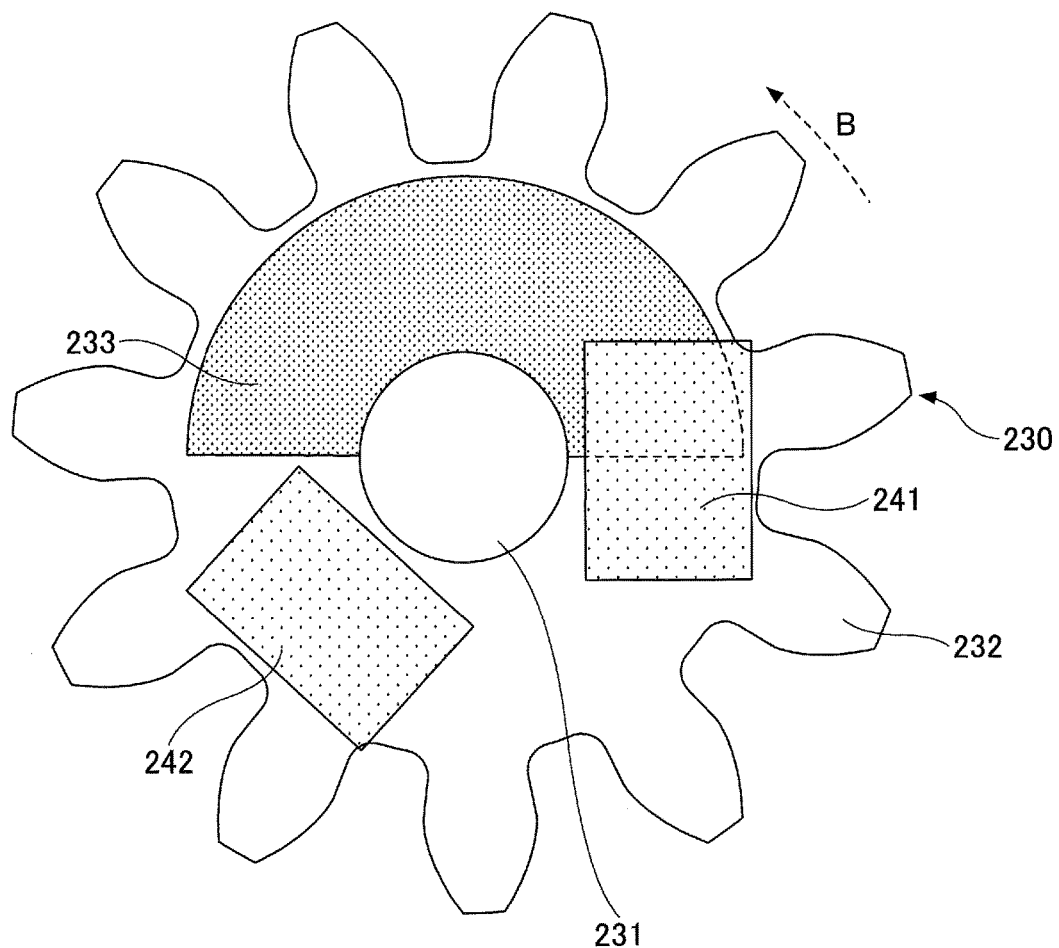
FIG. 18 is a drawing describing the method of detecting a counterclockwise rotation of the encoder wheel.

When the encoder wheel 230 is further rotated counterclockwise, the non-reflecting part 233 moves to a position illustrated in FIG. 18. In this state, the non-reflecting part 233 is not present in the detection position of the second photo sensor 242, and the second photo sensor 242 detects reflected light. On the other hand, the boundary between the non-reflecting part 233 and the reflecting part is present in the detection position of the first photo sensor 241. P23 in FIG. 15 indicates outputs of the first photo sensor 241 and the second photo sensor 242 in this state. At P23, a rising edge Pa of the output of the first photo sensor 241 is detected.

Figure 19:
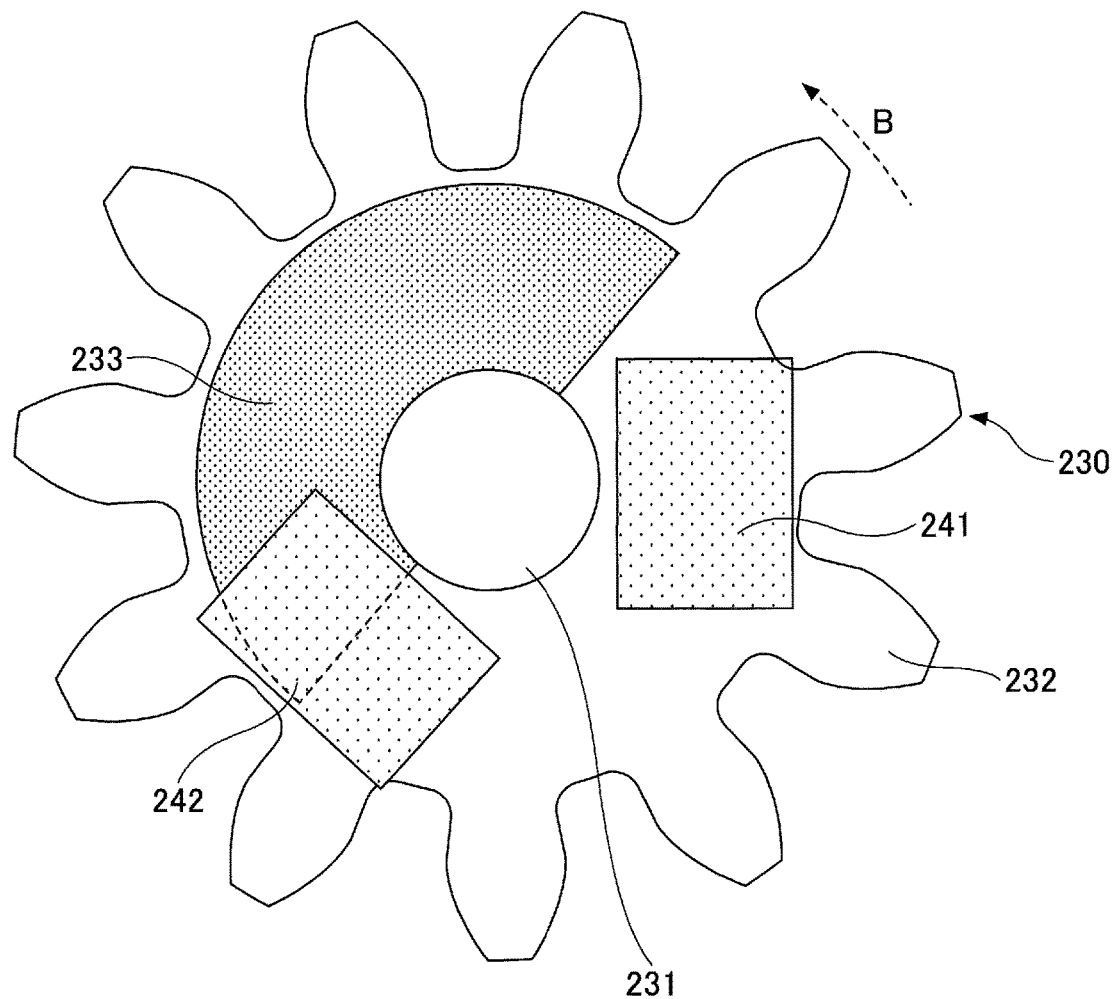
FIG. 19 is a drawing describing the method of detecting a counterclockwise rotation of the encoder wheel.

When the encoder wheel 230 is further rotated counterclockwise, the non-reflecting part 233 moves to a position illustrated in FIG. 19. In this state, the non-reflecting part 233 is not present in the detection position of the first photo sensor 241, and the first photo sensor 241 detects reflected light. On the other hand, the boundary between the non-reflecting part 233 and the reflecting part is present in the detection position of the second photo sensor 242. P24 in FIG. 15 indicates outputs of the first photo sensor 241 and the second photo sensor 242 in this state. At P24, a falling edge of the output of the second photo sensor 242 is detected.

Thus, the rotation of the dial knob 220 can be detected by detecting changes in the photo sensor outputs from H to L and L to H. When the reflected light is detected by the first photo sensor 241 and the second photo sensor 242 in this order as illustrated in FIG. 9, it is determined that the dial knob 220 is rotated clockwise. On the other hand, when the reflected light is detected by the second photo sensor 242 and the first photo sensor 241 in this order as illustrated in FIG. 15, it is determined that the dial knob 220 is rotated counterclockwise.

<Knock Switch>

As illustrated in FIG. 5, the knock switch 243 is disposed inside of the dial knob 220. As illustrated in FIG. 6, a pressing part 244 of the knock switch 243 protrudes slightly outward from an opening 253b. A bias spring 245 for restoring the pressed pressing part 244 to its original position is disposed outside of the inner cover 250 at a position corresponding to the knock switch 243.

Figure 20:
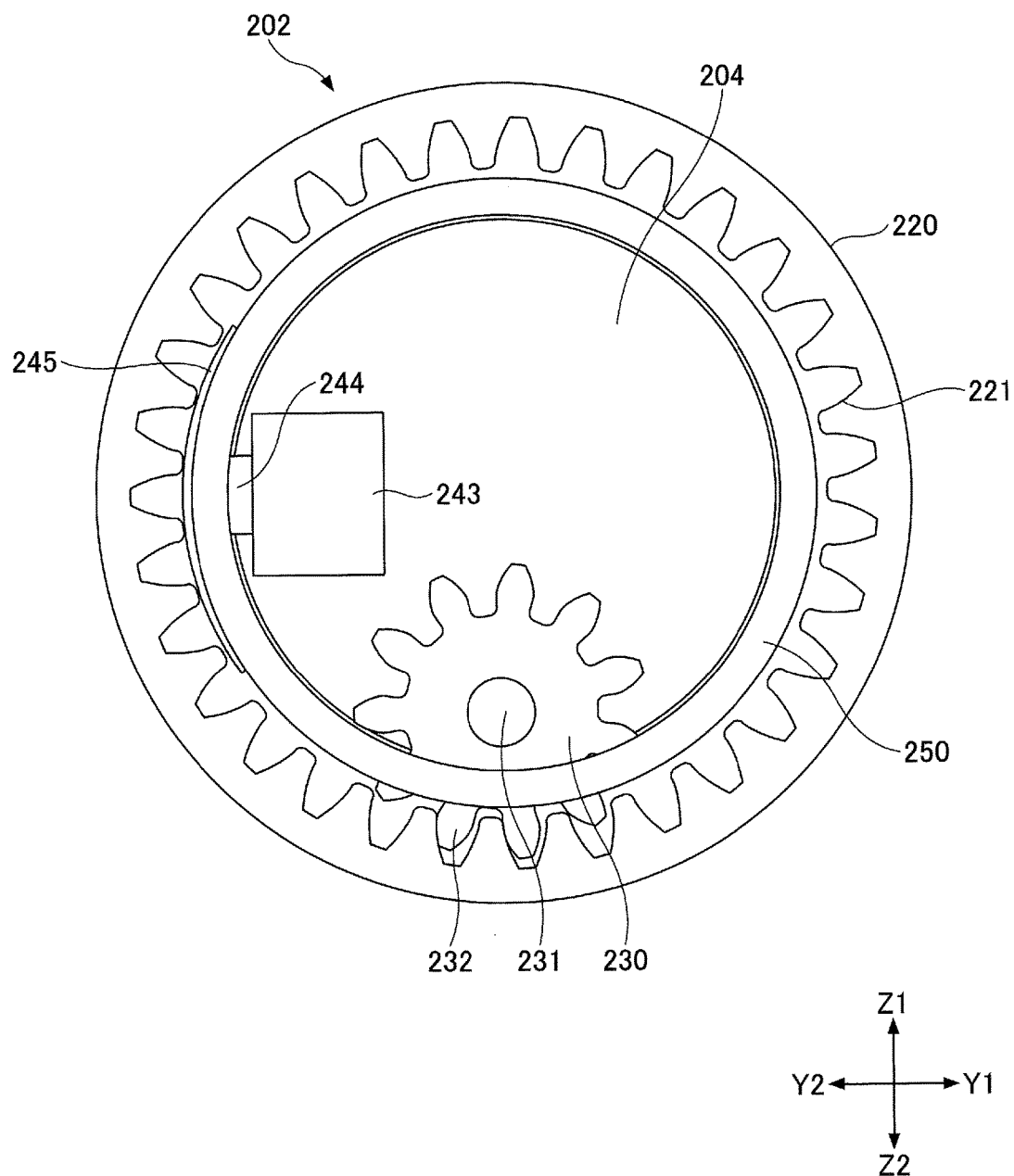
FIG. 20 is a drawing illustrating a knock switch of the printer.

In a state illustrated in FIG. 5, when the dial knob 220 is pressed at the position corresponding to the position of the knock switch 243 by, for example, a finger, the dial knob 220 moves in Y1 direction relative to the inner cover 250 and is decentered. As a result, as illustrated in FIG. 20, the dial knob 220 presses and deforms the bias spring 245, and the deformed bias spring 245 presses the pressing part 244 and thereby presses the knock switch 243. When the finger is moved away from the dial knob 220, the bias spring 245 and the pressing part 244 return to the original positions. FIG. 5 illustrates a state where the dial knob 220 is not pressed, and FIG. 20 illustrates a state where the dial knob 220 is pressed in Y1 direction.

Figure 21:
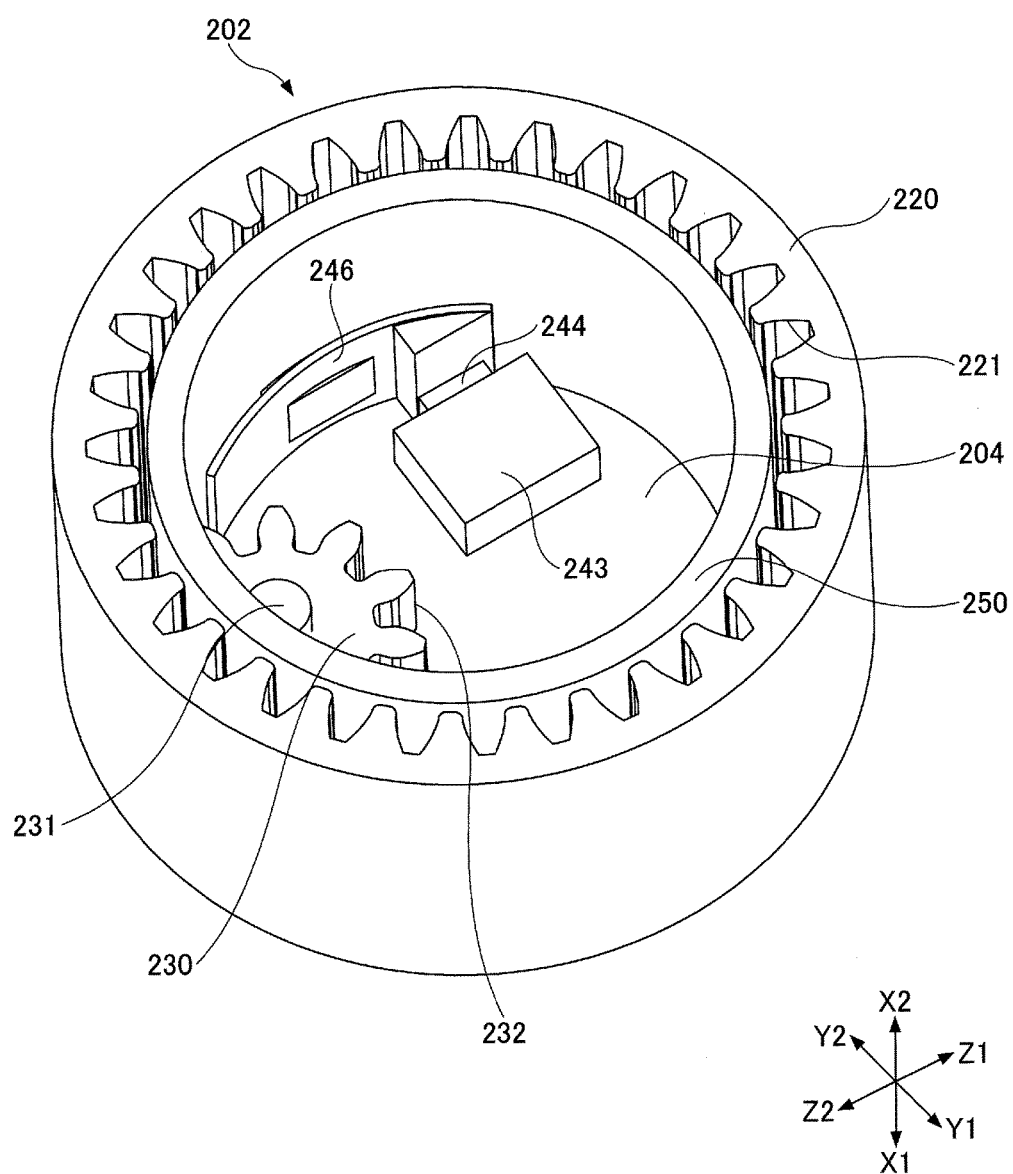
FIG. 21 is a drawing illustrating a variation of the knock switch.
Figure 22:
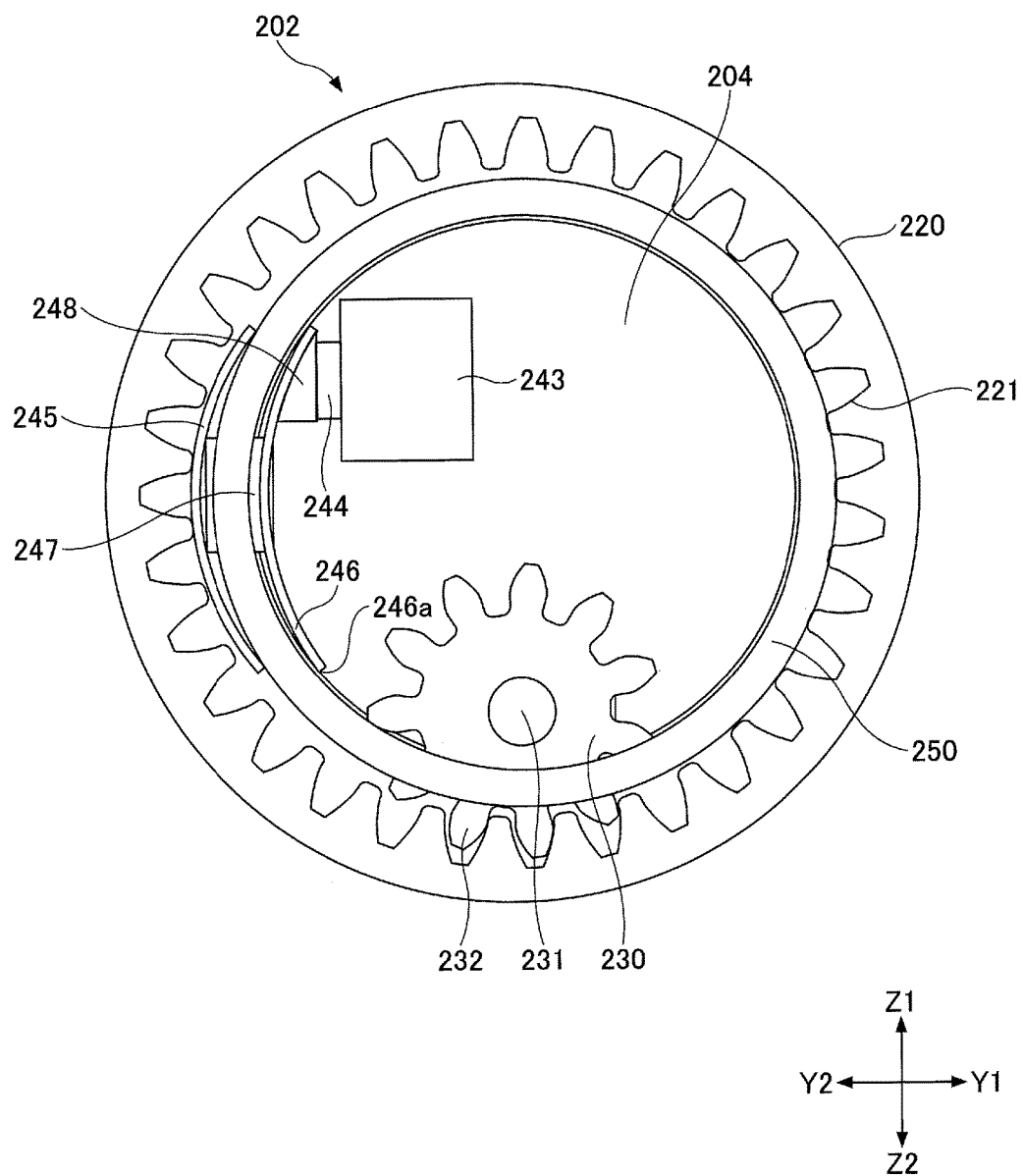
FIG. 22 is a drawing illustrating the variation of the knock switch.
Figure 23:
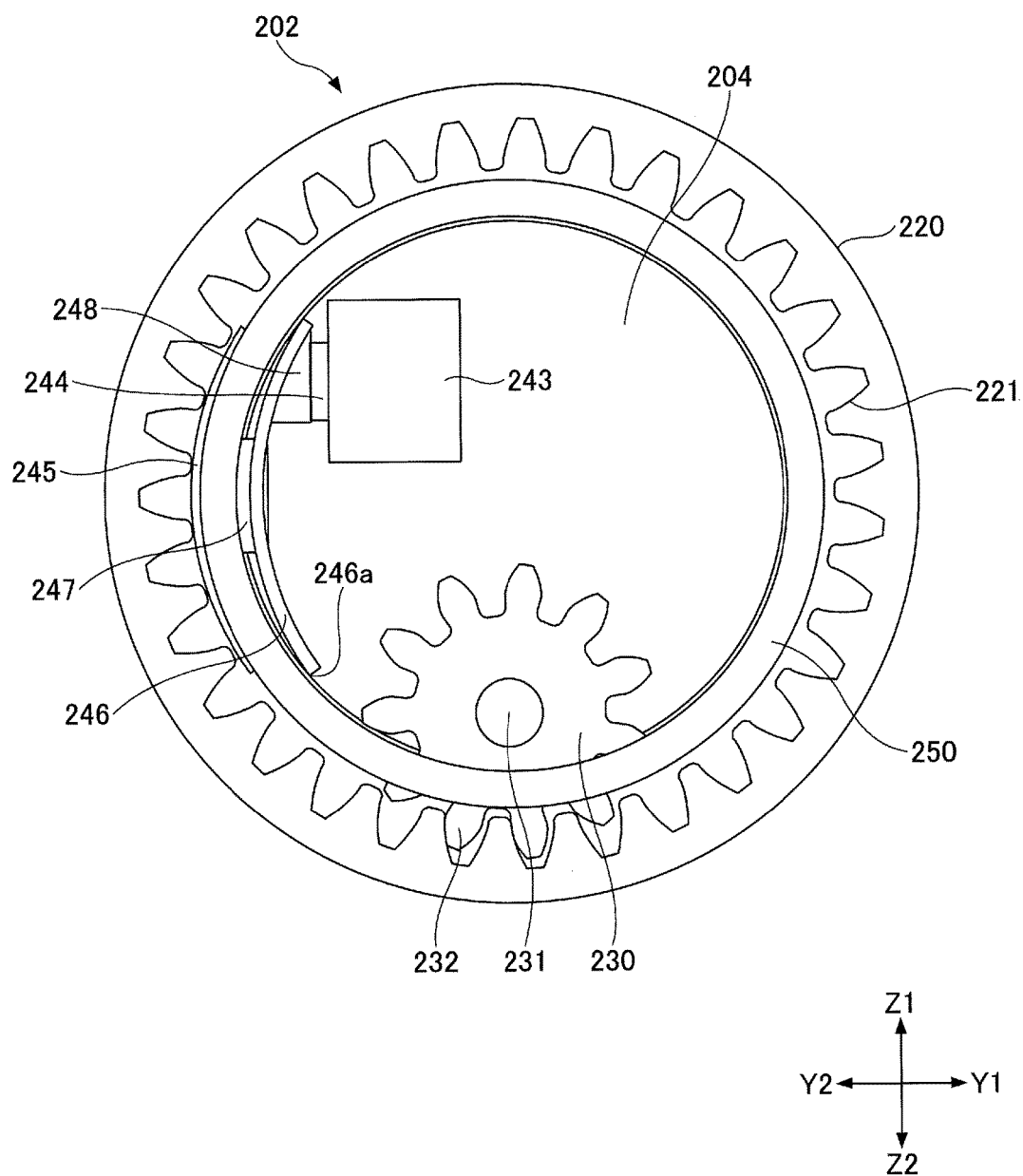
FIG. 23 is a drawing illustrating the variation of the knock switch.

As another mechanism for pressing the pressing part 244, an arm 246 for pressing the pressing part 244 may be provided as illustrated in FIGS. 21 through 23. The arm 246 is disposed inside of the inner cover 250. An arm pressing part 247 protruding slightly outward from an opening of the inner cover 250 is connected to the arm 246. When pressed by the bias spring 245, the arm pressing part 247 moves in Y1 direction and presses the arm 246. The arm 246 includes a pivot 246a at one end, and a switch pressing part 248 is provided at the other end. When pressed, the arm 246 rotates around the pivot 246a connected to the inner surface of the inner cover 250, and the switch pressing part 248 presses the pressing part 244. FIG. 21 is a perspective view of the printer 200 where the arm 246 is provided, FIG. 22 illustrates a state where the dial knob 220 is not pressed, and FIG. 23 illustrates a state where the dial knob 220 is pressed.

In the state illustrated in FIG. 22, when the dial knob 220 is pressed at a position corresponding to the position of the knock switch 243, the dial knob 220 moves in Y1 direction relative to the inner cover 250 and is decentered. As a result, as illustrated in FIG. 23, the dial knob 220 presses and deforms the bias spring 245. The bias spring 245 presses the arm 246 in Y1 direction via the arm pressing part 247 that is in contact with the bias spring 245, and the switch pressing part 248 presses the pressing part 244 and thereby presses the knock switch 243. When the finger is moved away from the dial knob 220, the bias spring 245 returns to its original position, the arm pressing part 247 and the arm 246 move in Y2 direction, and the pressing part 244 returns to its original position.

An information apparatus can also be operated by using the hook switch of the hook 201 instead of or together with the knock switch 243.

<Functional Blocks>

Figure 24:
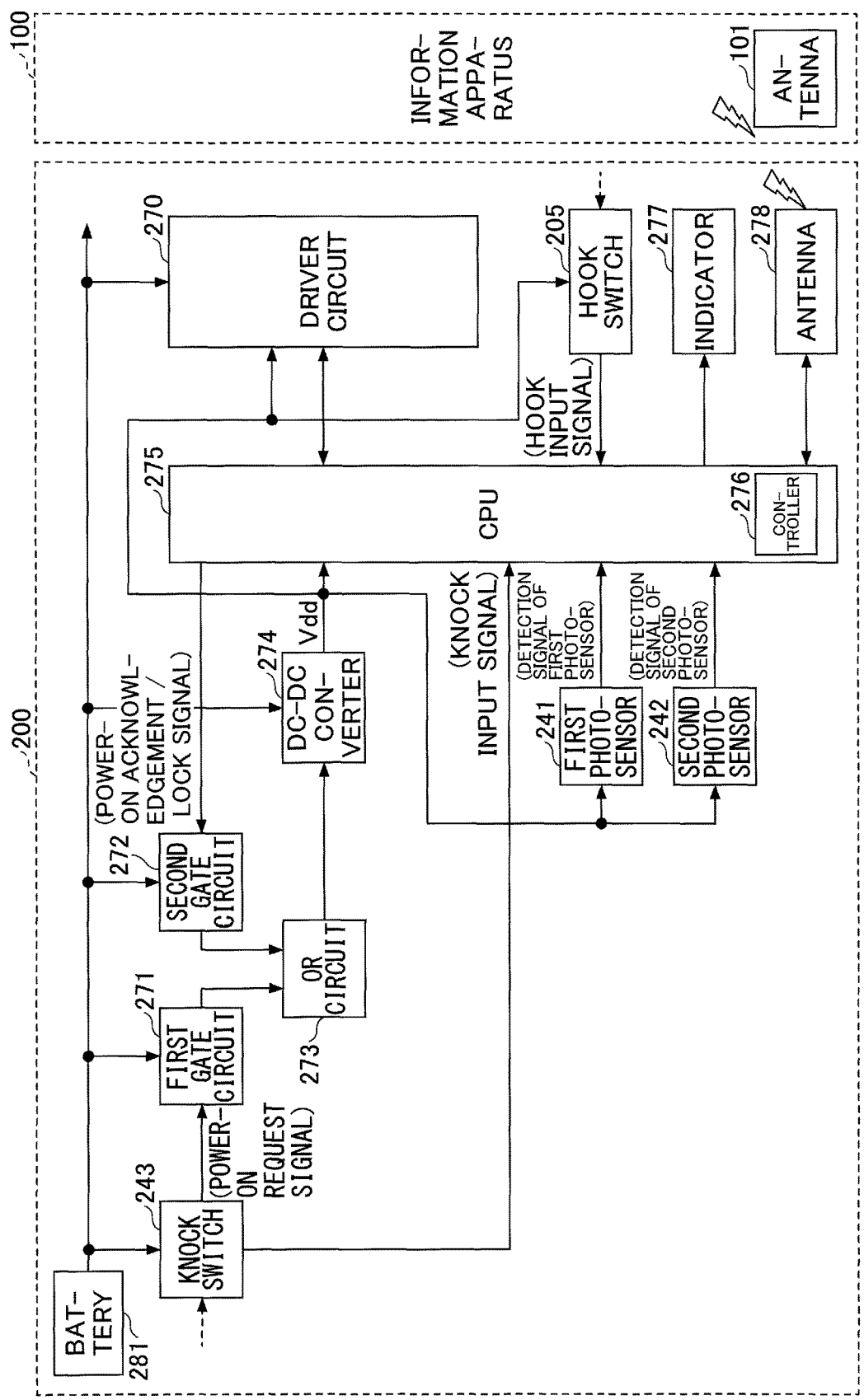
FIG. 24 is a block diagram illustrating a configuration of the printer.

Next, a configuration of the printer 200 is described with reference to FIG. 24. A battery 281 such as a lithium ion battery is placed in the power source 280. The printer 200 includes a driver circuit 270 for driving the printer 200, a first gate circuit 271, a second gate circuit 272, an OR circuit 273, a DC-DC converter 274, a central processing unit (CPU) 275 (controller), an indicator 277, and an antenna 278. The CPU 275 includes a controller 276 that controls radio communications performed with an information apparatus 100. The controller 276 and the antenna 278 may be collectively referred to as a "communication module".

The printer 200 can perform wireless information communications with the information apparatus 100. The information apparatus 100 and the printer 200 communicate with each other using, for example, BLE.

<Power-On Process>

Figure 25:
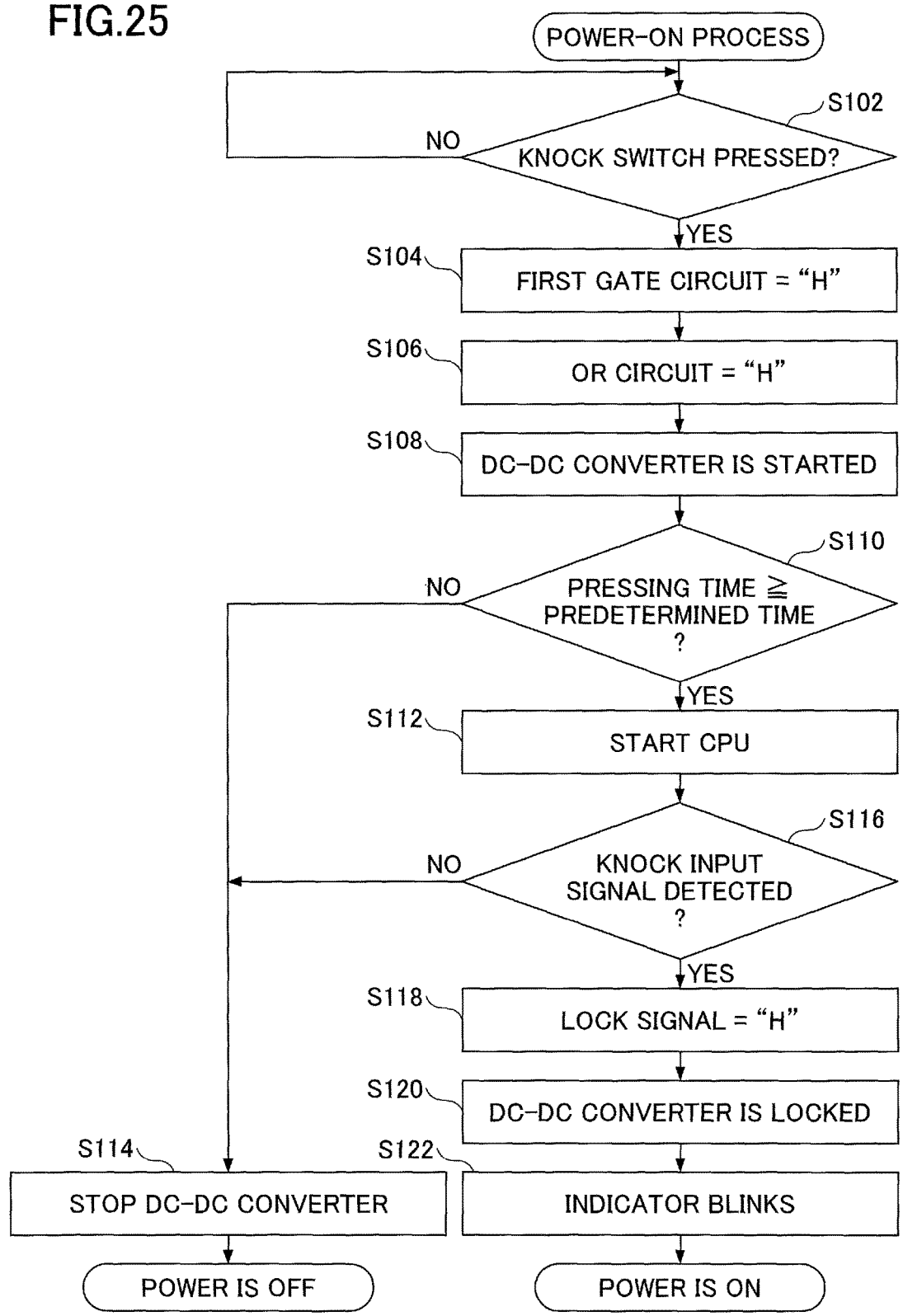
FIG. 25 is a flowchart illustrating a power-on process of the printer.

A process of turning on the printer 200 is described below with reference to FIGS. 24 and 25. To turn on the printer 200, the dial knob 220 is pressed inward for a predetermined period of time. That is, the knock switch 243 is pressed and held for a predetermined period of time.

At S102, whether the knock switch 243 is pressed is determined. If the knock switch 243 is pressed, the process proceeds to S104. If the knock switch 243 is not pressed, S102 is repeated. Here, a voltage is continuously applied to the knock switch 243 even when the printer 200 is turned off.

At S104, the knock switch 243 outputs a power-on request signal "H" for the CPU 275 to the first gate circuit 271 connected to the knock switch 243 while the knock switch 243 is pressed.

At S106, an output "H" from the first gate circuit 271 is input to the OR circuit 273, and the output of the OR circuit 273 becomes "H".

At S108, the output "H" from the OR circuit 273 is input to the DC-DC converter 274 to start the DC-DC converter 274, and the DC-DC converter 274 supplies power with a voltage Vdd to the CPU 275.

At S110, whether a pressing time for which the knock switch 243 is pressed is greater than or equal to a predetermined time is determined. When the pressing time is greater than or equal to the predetermined time, the process proceeds to S112.

When the pressing time is less than the predetermined time, the process proceeds to S114.

At S112, the CPU 275 is turned on, and the process proceeds to S116.

On the other hand, at S114, the DC-DC converter 274 is stopped, and the process ends with the printer 200 turned off.

At S116, whether a knock signal is input from the knock switch 243 to the CPU 275 is determined. The knock signal is generated when the knock switch 243 is turned on. When the knock signal is input to the CPU 275, the process proceeds to S118. When the knock signal is not input to the CPU 275, the process proceeds to S114. Thus, the CPU 275 determines whether the knock switch 243 is pressed and held for a predetermined period of time to confirm the intention of an operator operating the printer 200 and to prevent the printer 200 from being turned on by mistake.

At S118, the CPU 275 outputs to the second gate circuit 272 a lock signal "H" to acknowledge the power-on request and to keep the DC-DC converter 274 outputting power.

At S120, the DC-DC converter 274 is locked in a "start-up" state where the DC-DC converter 274 is turned on. When the lock signal "H" is input from the CPU 275 to the second gate circuit 272, the output of the second gate circuit 272 becomes "H" and input to the OR circuit 273. When the output "H" from the second gate circuit 272 is input to the OR circuit 273, the output of the OR circuit 273 becomes "H". The lock signal is continuously output even when the knock switch 243 is turned off. Accordingly, this state is maintained even when the operator stops pressing the knock switch 243. Thus, the DC-DC converter 274 to which the output "H" is input from the OR circuit 273 is locked in the start-up state. As a result, power is continuously supplied to the hook switch 205, the first photo sensor 241, and the second photo sensor 242.

At S122, the indicator 277 blinks multiple times. With the indicator 277 blinking multiple times, the operator can notice that the printer 200 is turned on. Through the above process, the printer 200 is turned on.

<Power-Off Process>

Figure 26:
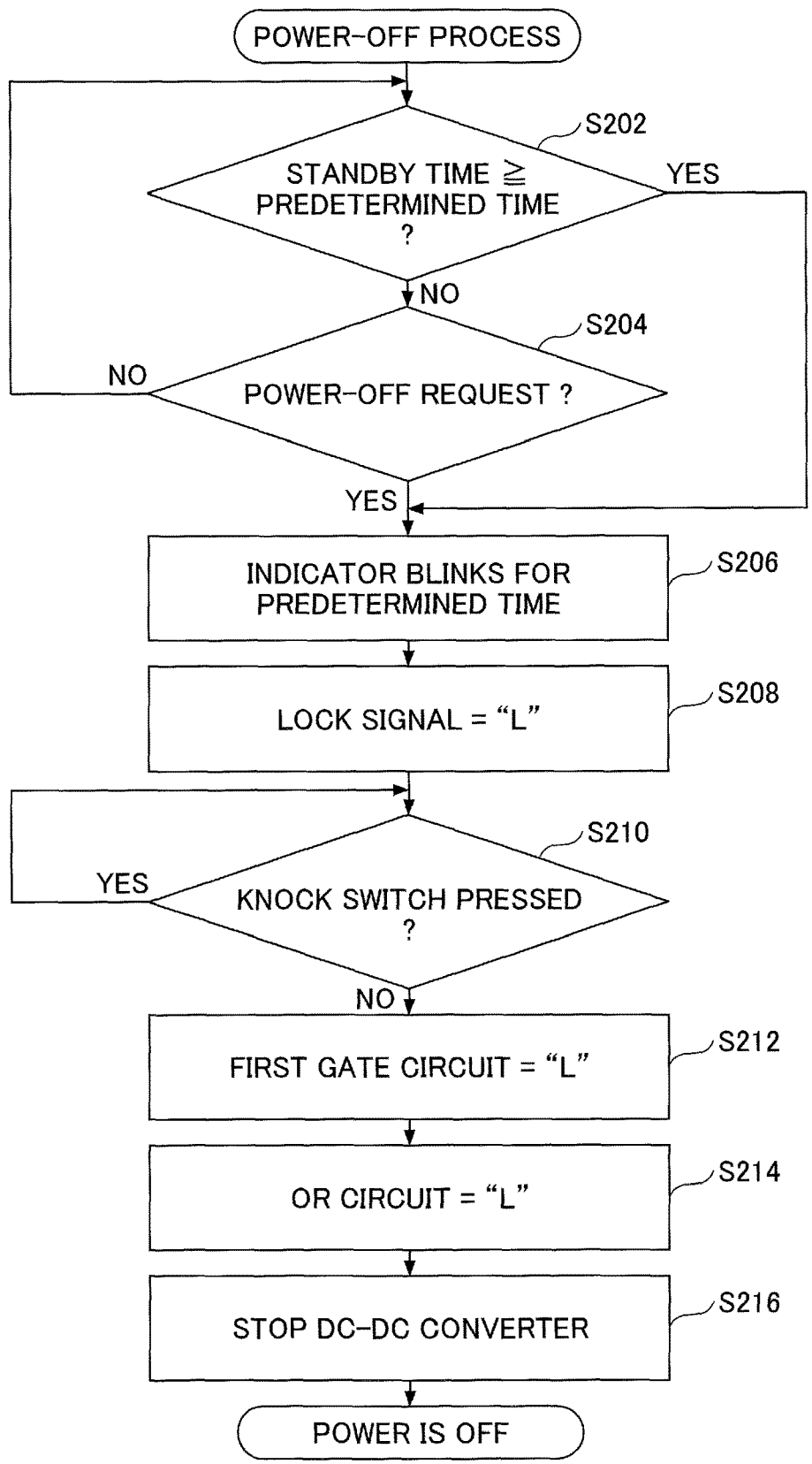
FIG. 26 is a flowchart illustrating a power-off process of the printer.

A process of turning off the printer 200 is described below with reference to FIGS. 24 and 26.

At S202, whether a standby time for which the printer 200 is kept idle without being operated is greater than or equal to a predetermined time is determined. When the standby time is greater than or equal to the predetermined time, the process proceeds to S206. When the standby time is less than the predetermined time, the process proceeds to S204.

At S204, whether a power-off request to turn off the printer 200 is received is determined. For example, when a power-off icon on the information apparatus 100 is selected by using the printer 200 wirelessly connected to the information apparatus 100, a signal to turn off the printer 200 is sent from the information apparatus 100 to the printer 200. Whether the power-off request is received may be determined based on whether the signal is received by the printer 200. When the power-off request is received, the process proceeds to S206. When the power-off request is not received, the process returns to S202.

At S206, the indicator 277 blinks for a predetermined time. With the indicator 277 blinking, the operator can notice that the printer 200 is in a state to be turned off.

At S208, whether a lock signal "L" is output from the CPU 275 to the second gate circuit 272 is determined. When the lock signal "L" is input to the second gate circuit 272, the output of the second gate circuit 272 becomes "L". Thereafter, the CPU 275 enters a standby state and does not perform operations such as information processing.

At S210, whether the pressing part 244 is pressed is determined. If the knock switch 243 is pressed, S210 is repeated. If the knock switch 243 is not pressed, the process proceeds to S212.

At S212, the output of the first gate circuit 271 becomes "L".

At S214, the output of the OR circuit 273, to which the output "L" from the first gate circuit 271 and the output "L" from the second gate circuit 272 are being input, becomes "L".

At S216, the DC-DC converter 274 to which the output "L" is being input from the OR circuit 273 stops and the printer 200 is turned off.

<Rotating Operation>

Figure 27:
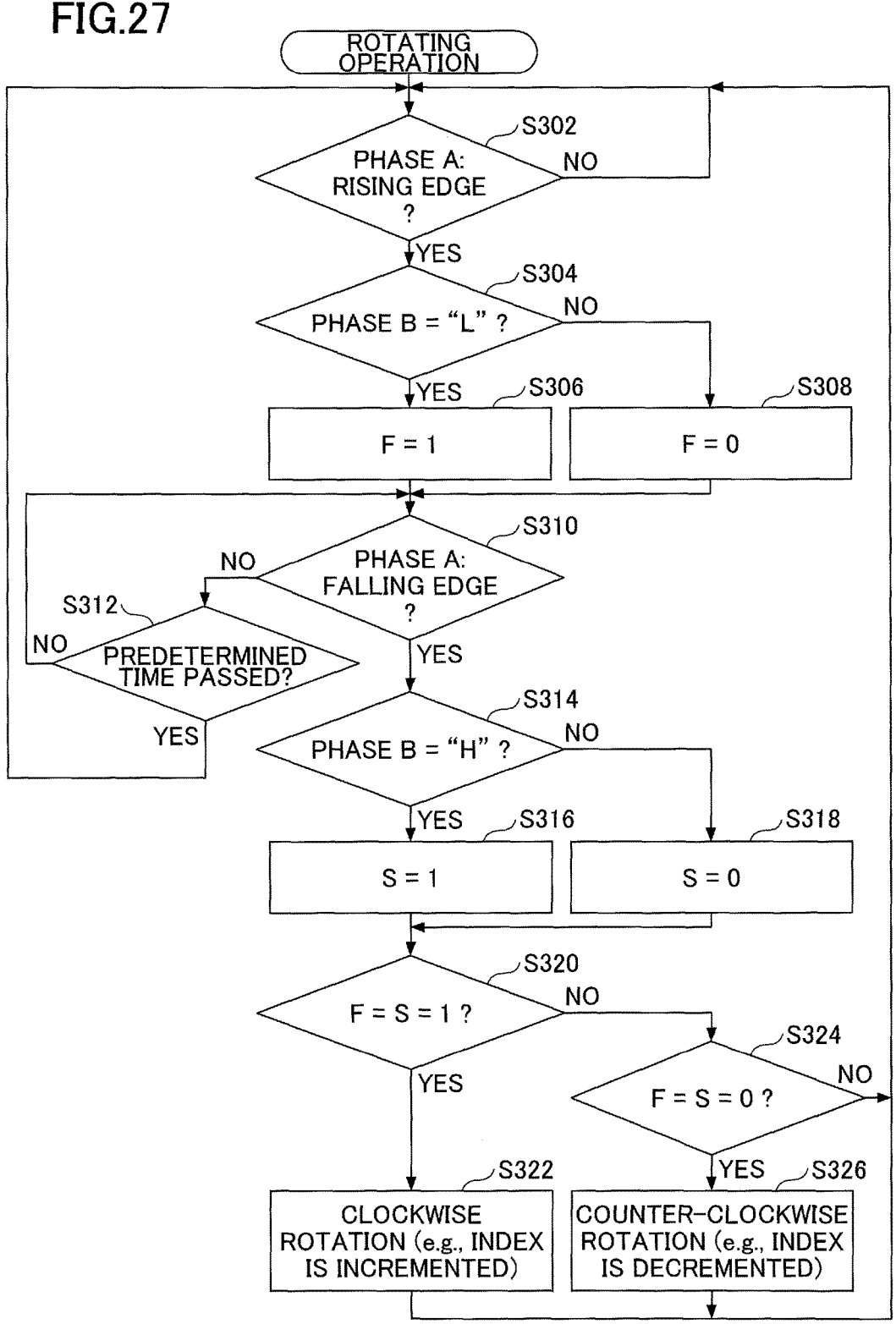
FIG. 27 is a flowchart illustrating an operation of a dial knob of the printer.

Next, an input operation performed by rotating the dial knob 220 is described with reference to FIGS. 9, 15, and 27. In this example, it is assumed that the output of the first photo sensor 241 is a phase A signal, the output of the second photo sensor 242 is a phase B signal, and the rotational direction of the dial knob 220 and the encoder wheel 230 is detected using the phase A signal as a reference signal. In this example, the rotational direction of the dial knob 220 is detected based on a phase difference between the phase A signal and the phase B signal.

A surface of the encoder wheel 230 facing the first and second photo sensors 241 and 242 includes the reflecting part and the non-reflecting part 233. When light emitted from a light emitter of the first photo sensor 241 or the second photo sensor 242 enters the reflecting part, a phototransistor of the photo sensor receives reflected light and is turned on, a current flows through a bias resistor connected to the emitter of the phototransistor, and a voltage "H" is generated and input to the CPU 275. When receiving the voltage "H", the CPU 275 determines that the reflecting part is detected. On the other hand, when the light enters the non-reflecting part 233, the phototransistor is turned off because the light is not reflected, and the voltage at the bias resistor becomes "L". When receiving the voltage "L", the CPU 275 determines that the non-reflecting part 233 is detected.

When detecting a change in the phase A signal from "L" to "H" in order of time, the CPU 275 determines that a rising edge of the phase A signal is detected. When detecting a change in the phase A signal from "H" to "L", the CPU 275 determines that a falling edge of the phase A signal is detected. The CPU 275 then detects the H or L level of a phase B signal.

The CPU 275 continuously detects the states of the phase A signal and the phase B signal. Flags F and S are provided in a memory of the CPU 275. For example, when the phase B signal is "L" at the rising edge of the phase A signal as illustrated in FIG. 9, the flag F is set to "1", and when the phase B signal is "H" at the rising edge of the phase A signal as illustrated in FIG. 15, the flag F is set to "0". When the phase B signal is "H" at the falling edge of the phase A signal as illustrated in FIG. 9, the flag S is set to "1", and when the phase B signal is "L" at the falling edge of the phase A signal as illustrated in FIG. 15, the flag S is set to "0". In this case, (F, S)=(1, 1) indicates a clockwise rotation, and (F, S)=(0, 0) indicates a counterclockwise rotation. When (F, S)=(0, 1) or (F, S)=(1, 0), the rotational direction is not determined, and the detection of the rising edge of the phase A signal is repeated. Here, values "0" and "1" are examples.

At S302, whether a rising edge of the phase A signal is detected is determined, by detecting the rising edge Pa in FIG. 9. When the rising edge of the phase A signal is detected, the process proceeds to S304. When the rising edge of the phase A signal is not detected, S302 is repeated.

At S304, whether the phase B signal is "L" is determined. When the phase B signal is "L" (corresponds to FIG. 9), the process proceeds to S306. When the phase B signal is not "L" (corresponds to FIG. 15), the process proceeds to S308.

At S306, the flag F is set to "1". At S308, the flag F is set to "0".

At S310, whether a falling edge of the phase A signal is detected is determined, by detecting the falling edge Pb in FIG. 9. When the falling edge of the phase A signal is detected, the process proceeds to S314. When the falling edge of the phase A signal is not detected, the process proceeds to S312.

At S312, it is determined whether a predetermined time has elapsed after the detection of the rising edge of the phase A signal at S302. When the predetermined time has elapsed after the detection of the rising edge of the phase A signal (timeout), it is determined that the dial knob 220 is not rotated, and the process returns to S302. When the predetermined time has not elapsed after the detection of the rising edge of the phase A signal, the process returns to S310.

When the falling edge of the phase A signal is detected at S310, whether the phase B signal is "H" is determined at S314. When the phase B signal is "H" as shown in FIG. 9, the process proceeds to S316. When the phase B signal is not "H" as shown in FIG. 15, the process proceeds to S318.

At S316, the flag S is set to "1". At S318, the flag S is set to "0".

At S320, whether both of the flag F and the flag S are "1" is determined. When both of the flag F and the flag S are "1", the process proceeds to S322. When one or both of the flag F and the flag S are not "1", the process proceeds to S324.

When both of the flag F and the flag S are "1", it is determined at S322 that the dial knob 220 and the encoder wheel 230 have been rotated clockwise, and the process returns to S302.

At S324, whether both of the flag F and the flag S are "0" is determined. When both of the flag F and the flag S are "0", the process proceeds to S326. When at least one of the flag F and the flag S is not "0", the process returns to S302.

When both of the flag F and the flag S are "0", it is determined at S326 that the dial knob 220 and the encoder wheel 230 have been rotated counterclockwise, and the process returns to S302.

As described above, the rotation and the rotational direction of the dial knob 220 and the encoder wheel 230 can be detected by using the first photo sensor 241 and the second photo sensor 242. Although the phase A signal is used as a reference signal in the above process, the phase B signal may instead be used as a reference signal.

<Operations of Information Communication Apparatus>

A desktop printer is generally used as a slave device and includes functions such as for turning on and off the printer, for switching between online and offline, and to feed paper. However, to increase the range of uses and improve the convenience, a printer of the present embodiment preferably includes a function to start an application on an information apparatus and to select icons on a menu screen of the application.

The printer 200 includes a knock dial function. For example, when the knock switch 243 is pressed, the CPU 275 determines that an application start request is entered and sends the application start request to the information apparatus 100 via a BLE module. When receiving the application start request, the information apparatus 100 sends an acknowledgement to the printer 200. When, for example, the dial knob 220 is rotated clockwise after the acknowledgement is received, the printer 200 requests the information apparatus 100 to open a menu screen. When receiving the request, the information apparatus 100 sends an acknowledgement to the printer 200 and opens the menu screen. An operator can move a cursor to a desired icon by rotating the dial knob 220 clockwise or counterclockwise and select the icon by pressing the knock switch 243 to open a submenu. After repeating this operation, the operator may select a print icon by pressing the knock switch 243. In response, the information apparatus 100 executes a print task and sends print data to the printer 200. The printer 200 processes and prints the print data. The knock dial function enables an operator to perform such an interactive operation.

Figure 28:
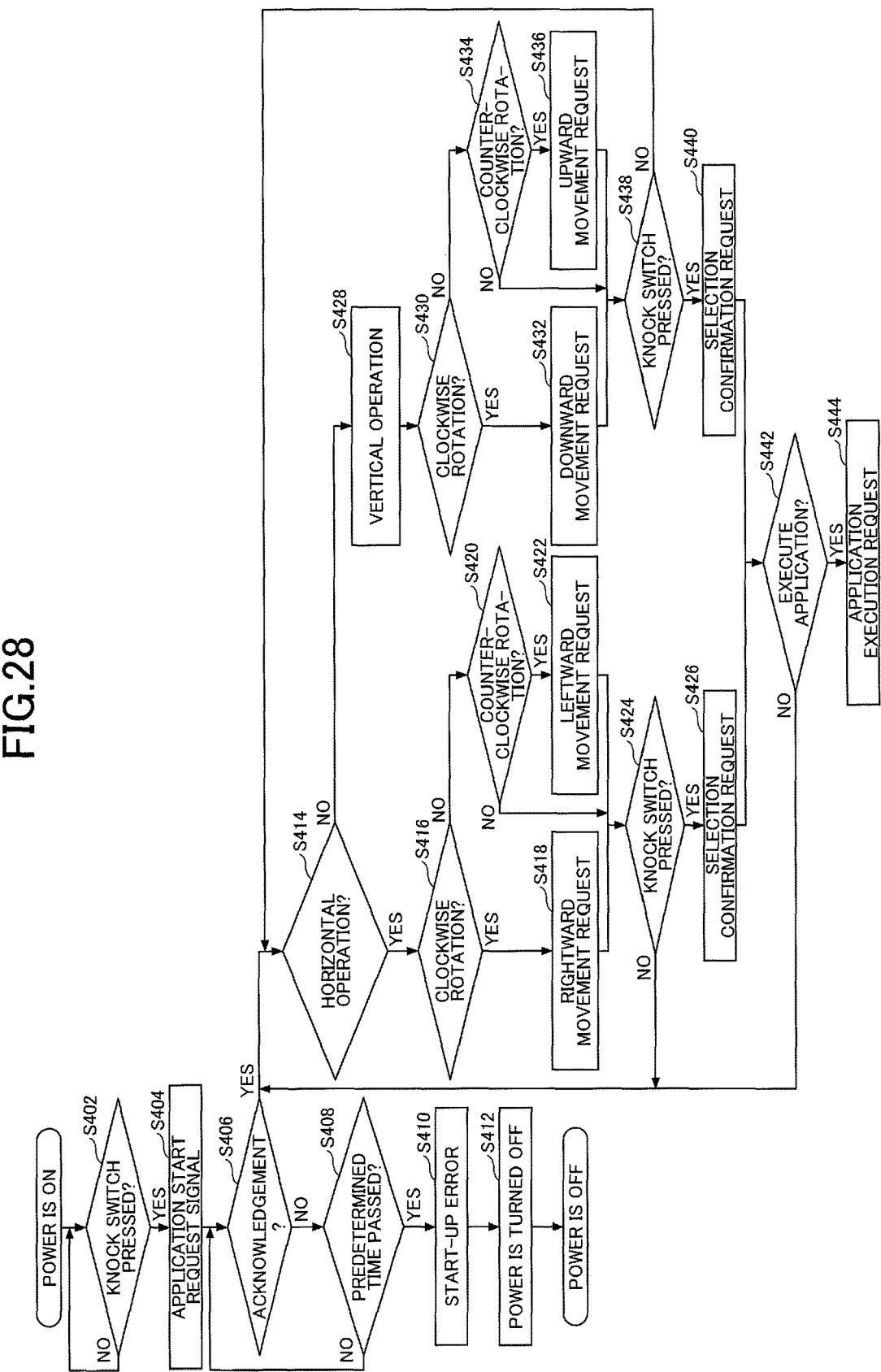
FIG. 28 is a flowchart illustrating a process of operating an information communication apparatus using the printer.
Figure 29:
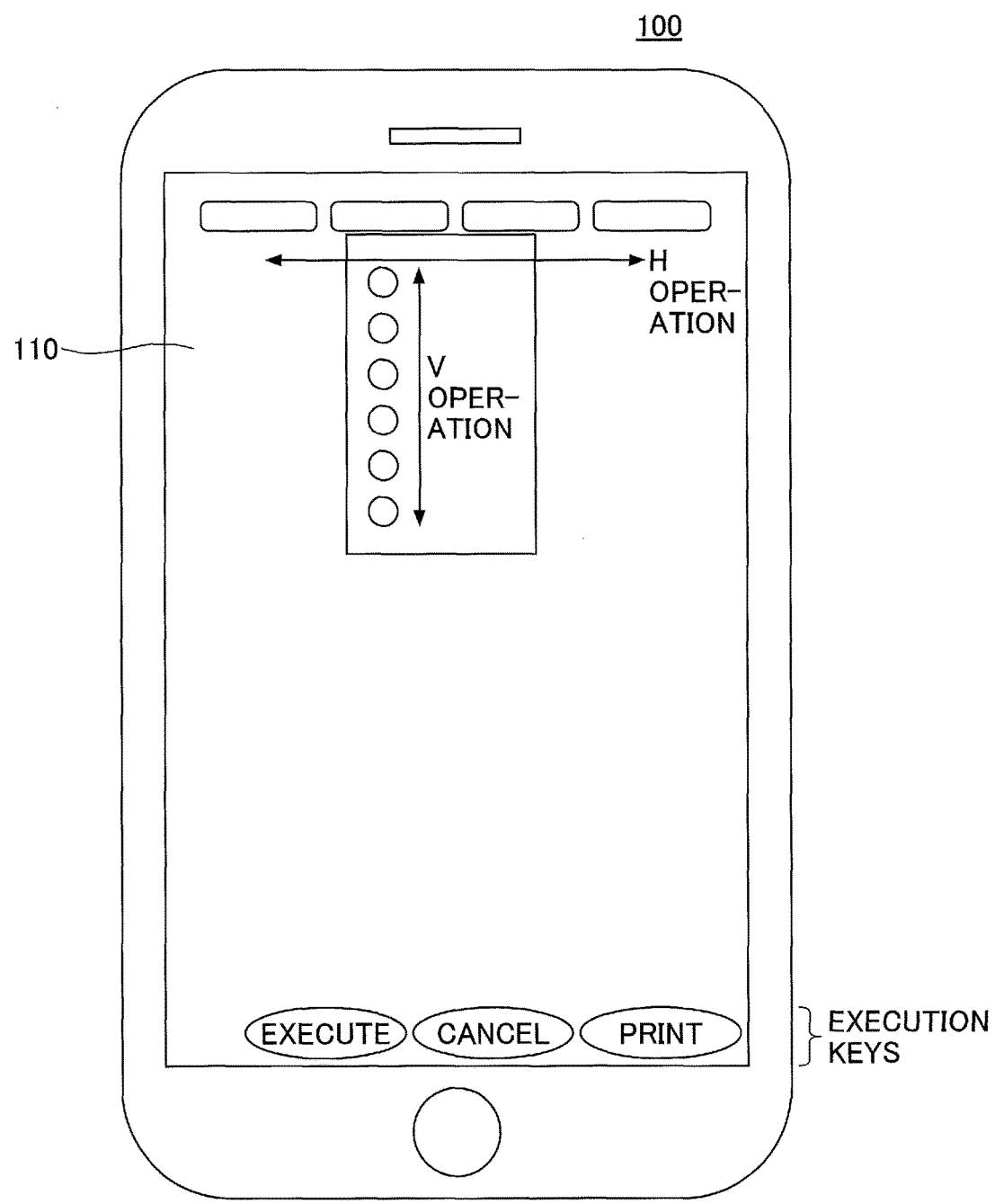
FIG. 29 is a drawing illustrating an information communication apparatus.

Next, a process of operating the information apparatus 100 by using the printer 200 is described with reference to FIGS. 28 and 29. An operator can start an application on the information apparatus 100 by pressing the knock switch 243 while the printer 200 is turned on.

At S402, whether the knock switch 243 is pressed while the printer 200 is turned on is determined. When the knock switch 243 is pressed, the process proceeds to S404. When the knock switch 243 is not pressed, S402 is repeated.

At S404, the printer 200 sends a start request signal requesting to start an application to the information apparatus 100. When receiving the start request signal from the printer 200, the information apparatus 100 determines whether to accept the start request. When the start request is accepted, the information apparatus 100 starts the application related to the printer 200. Then, when the information apparatus 100 becomes ready for data transmission and reception with the printer 200, the information apparatus 100 sends an acknowledgement to the printer 200. On the other hand, when the start request is not accepted, the information apparatus 100 sends a negative acknowledgement to the printer 200.

At S406, the printer 200 determines whether an acknowledgement is received from the information apparatus 100. When an acknowledgement is received from the information apparatus 100, the process proceeds to S414. When no acknowledgement is received or a negative acknowledgement is received from the information apparatus 100, the process proceeds to S408.

At S408, the printer 200 determines whether a predetermined time has elapsed after sending the start request signal to the information apparatus 100 at S404. When the predetermined time has elapsed, the process proceeds to S410. When the predetermined time has not elapsed, the process returns to S406.

At S410, the printer 200 determines that an application start-up error has occurred. Then, at S412, the printer 200 is turned off. For example, the application start-up error occurs when the information apparatus 100 is busy and denies the start request or the information apparatus 100 is turned off and is not able to communicate with the printer 200.

At S414, the printer 200 determines whether a horizontal operation (H operation), where a cursor on a display screen 110 of the information apparatus 100 is moved in a horizontal direction, is used to select an icon. When the H operation is used, the process proceeds to S416. When the H operation is not used, the process proceeds to S428. Either the H operation or a vertical operation (V operation) is used to select an icon depends on screens displayed on the display screen 110. For example, the printer 200 sends a horizontal cursor movement request to the information apparatus 100 and determines whether an acknowledgement or a negative acknowledgement is received from the information apparatus 100. When an acknowledgement is received, the printer 200 proceeds to S416. When a negative acknowledgement is received, the printer 200 proceeds to S428.

At S416, the printer 200 determines whether the dial knob 220 is rotated clockwise. When the dial knob 220 is rotated clockwise, the process proceeds to S418. When the dial knob 220 is not rotated clockwise, the process proceeds to S420.

At S418, the printer 200 sends a signal to move the cursor rightward. When receiving the signal, the information apparatus 100 moves the cursor displayed on the display screen 110 rightward to select an icon on the right side.

At S420, the printer 200 determines whether the dial knob 220 is rotated counterclockwise. When the dial knob 220 is rotated counterclockwise, the process proceeds to S422. When the dial knob 220 is not rotated counterclockwise, the process proceeds to S424.

At S422, the printer 200 sends a signal to move the cursor leftward. When receiving the signal, the information apparatus 100 moves the displayed cursor leftward to select an icon on the left side.

At S424, the printer 200 determines whether the knock switch 243 is pressed. When the knock switch 243 is pressed, the selection of the icon is fixed, and the process proceeds to S426. When the knock switch 243 is not pressed, the process returns to S414.

At S426, the printer 200 sends a selection confirmation request signal indicating that the selection of the icon is fixed. When the information apparatus 100 receives the signal, the selection of the icon displayed on the display screen 110 is fixed.

At S428, the printer 200 determines that a vertical operation (V operation), where a cursor on the display screen 110 is moved in a vertical direction, is used to select an icon.

At S430, the printer 200 determines whether the dial knob 220 is rotated clockwise. When the dial knob 220 is rotated clockwise, the process proceeds to S432. When the dial knob 220 is not rotated clockwise, the process proceeds to S434.

At S432, the printer 200 sends a signal to move the cursor downward. When receiving the signal, the information apparatus 100 moves the displayed cursor downward to select an icon on the lower side.

At S434, the printer 200 determines whether the dial knob 220 is rotated counterclockwise. When the dial knob 220 is rotated counterclockwise, the process proceeds to S436.

When the dial knob 220 is not rotated counterclockwise, the process proceeds to S438.

At S436, the printer 200 sends a signal to move the cursor upward. When receiving the signal, the information apparatus 100 moves the displayed cursor upward to select an icon on the upper side.

At S438, the printer 200 determines whether the knock switch 243 is pressed. When the knock switch 243 is pressed, the selection of the icon is fixed, and the process proceeds to S440.

When the knock switch 243 is not pressed, the process returns to S414.

At S440, the printer 200 sends to the information apparatus 100 a confirmation request signal indicating that the selection of the icon is fixed. When the information apparatus 100 receives the signal, the selection of the icon displayed on the display screen 110 is fixed.

At S442, whether to execute an application on the information apparatus 100 is determined. When an application execution icon is selected on the information apparatus 100, the process proceeds to S444. When a nest processing icon or a cancel icon is selected, the process returns to S414.

At S444, the application is executed on the information apparatus 100. When a print execution icon is selected, the information apparatus 100 sends print data to the printer 200. The printer 200 prints the print data if no error is detected in the printer 200. When the printing is completed, the printer 200 sends an acknowledgement to report the completion to the information apparatus 100, and ends the process. If an error occurs during the printing, the printer 200 sends error information to the information apparatus 100.

A printer according to the embodiment of the present invention is described above. However, the present invention is not limited to the specifically disclosed embodiment, and variations and modifications may be made without departing from the scope of the present invention.

What is claimed is:
1. A printer, comprising:
a print module that prints data on a recording medium;
a communication module that wirelessly communicates with an information apparatus;
a pressable switch;
a rotatable dial knob; and
a controller that sends, via the communication module to the information apparatus, information for operating the information apparatus according to operations of the switch and the dial knob, wherein
the dial knob has a cylindrical shape and includes an outer circumferential surface extending around an axis of rotation of the dial knob; and
the switch is disposed inside of the dial knob and configured to be turned on and off by pressing the outer circumferential surface of the dial knob in a direction orthogonal to the axis of rotation of the dial knob.
2. The printer as claimed in claim 1, further comprising:
an encoder wheel that is disposed inside of the dial knob and rotates along with rotation of the dial knob, the encoder wheel including a reflecting part that reflects light and a non-reflecting part whose optical reflectance is less than an optical reflectance of the reflecting part;
a first photo sensor that detects light reflected from the encoder wheel and outputs a first signal; and
a second photo sensor that detects light reflected from the encoder wheel and outputs a second signal,
wherein the controller detects the rotation of the dial knob and a direction of the rotation of the dial knob based on a difference between the first signal and the second signal.
3. The printer as claimed in claim 2, wherein the controller is configured to select an icon displayed on a display screen of the information apparatus by sending information corresponding to the direction of the rotation of the dial knob to the information apparatus.
4. A printer, comprising:
a print module that prints data on a recording medium;
a communication module that wirelessly communicates with an information apparatus;

a cylindrical rotatable dial knob that includes first gear teeth on an inner side thereof;

an encoder wheel that is disposed inside of the dial knob and rotates along with rotation of the dial knob, the encoder wheel including second gear teeth that engage with the first gear teeth, a reflecting part that reflects light, and a non-reflecting part whose optical reflectance is less than an optical reflectance of the reflecting part;

a first photo sensor that detects light reflected from the encoder wheel and outputs a first signal;

a second photo sensor that detects light reflected from the encoder wheel and outputs a second signal, the first photo sensor and the second photo sensor detecting light reflected from different portions of the encoder wheel; and a controller that detects the rotation of the dial knob and a direction of the rotation of the dial knob based on a phase difference between the first signal and the second signal.

5. The printer as claimed in claim 4, wherein the non-reflecting part has a semicircular shape.

* * * * *